US006549858B1

(12) United States Patent
Shelley et al.

(10) Patent No.: US 6,549,858 B1
(45) Date of Patent: Apr. 15, 2003

(54) STRUCTURAL CONTROL AND MONITORING USING ADAPTIVE SPATIO-TEMPORAL FILTERING

(75) Inventors: Stuart J. Shelley, Cincinnati, OH (US); Håvard I. Vold, Cincinnati, OH (US)

(73) Assignee: Sheet Dynamics, Ltd., Cincinnati, OH (US); a partial interest (*) Notice: Subject to any disclaimer, the term of this patent is extended or adjusted under 35 U.S.C. 154(b) by 0 days.

(21) Appl. No.: 09/239,890

(22) Filed: Jan. 29, 1999

Related U.S. Application Data

(60) Provisional application No. 60/073,514, filed on Feb. 3, 1998.

(51) Int. Cl.[7] .................................................. G01H 1/00
(52) U.S. Cl. .......................... 702/56; 702/190; 702/197
(58) Field of Search ............................... 702/56, 33–36, 702/39, 41–43, 54, 75–77, 103, 105, 106, 108, 113–115, 122, 123, 124, 126, 127, 141, 182–185, 188–191, 193, 195, 197, FOR 107, FOR 108, FOR 123–FOR 126, FOR 134, FOR 135, FOR 141, FOR 151, FOR 164, FOR 166, FOR 168, FOR 170, FOR 171; 324/76.28, 76.29, 76.31; 700/29–31, 280, 275, 274; 703/1, 2, 6, 7; 708/300–304, 815, 819; 73/570, 579, 602, 659, 660, 662, 804, DIG. 1

(56) References Cited

U.S. PATENT DOCUMENTS

| | | | | |
|---|---|---|---|---|
| 4,942,623 A | | 7/1990 | Asawa et al. | 385/28 |
| 5,193,056 A | | 3/1993 | Boes | 705/36 |
| 5,255,565 A | | 10/1993 | Judd et al. | 73/579 |
| 5,434,773 A | | 7/1995 | Melcher | 700/30 |
| 5,579,243 A | | 11/1996 | Levine | 708/300 |
| 5,691,924 A | | 11/1997 | Czyzewski et al. | 702/77 |
| 5,841,030 A | * | 11/1998 | Honsberg et al. | 73/579 |
| 6,002,232 A | * | 12/1999 | McConnell et al. | 702/77 |
| 6,138,512 A | * | 10/2000 | Roberts et al. | 73/579 |

OTHER PUBLICATIONS

Shelley, S.J. "Investigation of Discrete Modal Filters for Structural Dynamic Applications," Doctor of Philosophy Dissertation, University of Cincinnati, Department of Mechanical, Industrial, and Nuclear Engineering, 1991, p. I–XVII, 1–269. (No month).

Schultze, J.F., Rost, R.W., Shelley, S.J. "Adaptive Modal Space Control of Flexible Structures:Applications," 15th International Modal Analysis Conference (IMAC), Orlando, Florida, Feb. 3–6, 1997, 7 pages.

Shelley, S.J., Vold, H., Mains, M., Sharp, T.D., "Structural Control and Monitoring Using Adaptive Spatio–Temporal Filtering," 15th International Modal Analysis Conference (IMAC), Orlando Florida, Feb. 3–6, 1997, 7 pages.

(List continued on next page.)

*Primary Examiner*—Hal Wachsman
(74) *Attorney, Agent, or Firm*—Bose McKinney & Evans LLP

(57) ABSTRACT

A method and apparatus for decoupling complex multiple degree-of-freedom (MDOF) responses measured on linear dynamic systems into constituent single degree-of-freedom (SDOF) modal responses. A data acquisition and processing system periodically samples response signals generated by a plurality of sensors spaced at various locations on a linear dynamic system. The processing system calculates a plurality of sets of spatio-temporal filter coefficients based upon time-shifted digitized response signals. A synthesizer applies the spatio-temporal filter coefficients to the response signals, thereby generating synthesized signals representing decoupled SDOF responses of the linear dynamic system. Means are provided for receiving input signals representing a plurality of excitation inputs and for calculating input influence coefficients based upon the time-shifted digitized response signals and the excitation input signals.

31 Claims, 19 Drawing Sheets

OTHER PUBLICATIONS

Bosse, A., Shelley, S., Lim, Tae., "On the Feasibility of Adaptive Vibration Control of Space Truss Using Modal Filters and a Neural Network" 1996 Symposium on Smart Structures and Materials, SPIE vol. 217, Paper #55, San Diego, CA, Feb., 13 pages.

Schultze, J.F., Rost R.W., Shelley, S.J. "Adaptive Modal Space Control of Flexible Structures: Theory," 14th International Modal Analysis Conference (IMAC), Dearborn, Michigan, Feb. 12–15, 1996, 13 pages.

Shelley, S.J., Lee, K.L., Aksel, T., Aktan, A.E., Active Control and Forced Vibration Studies on a Highway Bridge, ASCE Journal of Structural Engineering, vol. 121, No. 9, Sept. 1995, 7 pages.

Shelley, S.J. Aktan, E.A., Lee, K.L., "Modal Filter Based Structural Control of a Highway Bridge," Proceedings of the Eleventh Conference on Analysis and Computation, ASCE Structures Congress XII, Atlanta, Georgia, Apr. 24–28, 1994, 10 pages.

Shelley, S.J., Aktan, A.E., Brown, D.L., Allemang, R.J., "Active Control of Vibration in Civil Engineering Structures," Proceedings of the 12th International Modal Analysis Conference (IMAC), Honolulu, Hawaii, Jan. 31–Feb. 3, 1994, 7 pages.

Shelley, S.J., Aktan, A.E., Frederick, N., "Active Vibration Control of a 250 Foot Span Steel Truss Highway Bridge," Second IEEE Conference on Control Applications, Vancouver, B.C., Sep. 13–16, 1993, 2 pages.

Shelley, S.J., Allenmang, R.J., Slater, G.L., Schultze, J.F., "Active Vibration Control Utilizing an Adaptive Modal Filter Based Model Control Method," 11th International Modael Analysis Conference, Kissimee, Florida, Feb. 1–4, 1993, 8 pages.

Slater, G.L., Shelley, S.J. "Health Monitoring of Flexible Structures Using Modal Filter Concepts," Proceedings of the 1993 North American Conference on Smart Structures and Materials, Albuquerque, New Mexico, Jan. 31–Feb. 4, 1993, 12 pages.

Shelley, S.J., Schultze, J.F., Rost, R.W., Allemang, R.J., "Active Vibration Control Utilizing a Discrete Modal Filter Based Control Technique", The 17th International Seminar on Modal Analysis and Structural Dynamics, Katholieke Universiteit Leuven, Belgium, Sep., 1992, 16 pages.

Shelley, S.J., Allemang, R.J., "Calculation of Discrete Modal Filters Using the Modified Reciprocal Modal Vector Method," Proceedings of the 10th International Modal Analysis Conference (IMAC), San Diego, California, Feb. 3–8, 1992, pp. 37–45.

Shelley, S.J., Freudinger, L.C., Allemang, R.J., "Development of an On–Line Parameter Estimation System Using the Discrete Modal Filter," Proceedings of the 10th International Modal Analysis Conference (IMAC), San Diego, California, Feb. 3–8, 1992, pp. 173–183.

Shelley, S.J., Freudinger, L.C., Allemang, R.J., Zhang, Q. "Implementation of a Modal Filter on a Five Meter Truss Structure," Proceedings of the 9th International Modal Analysis Conference (IMAC). Feb. 1991, 9 pages.

Shelley, S.J., Aktan, E.A., Lee, K.L., "Active Vibration Control of a 250 Foot Span Steel Truss Highway Bridge," Ninth VPI&SU Symposium on Dynamics and Control of Large Structures, Virginia Polytechnic Institute and State University, Blacksburg, Virginia, May 10–12, 1993, 7 pages.

Meirovitch, L., Baruh, H., "Control of Self–Adjoint Distributed Parameter Systems," Journal of Guidance, Control and Dynamics, vol. 5, No. 1, Jan.–Feb. 1982, pp. 60–66.

Oz, H., Meirovitch, L., "Stochastic Independent Modal–Space Control of Distributed–Parameter Systems," Journal of Optimization Theory and Applications, vol. 40, No. 1, May 1983, pp. 121–154.

Meirovitch, L., Baruh, J., "On the Problem of Observation Spillover in Self–Adjoint Distributed–Parameter Systems," Journal of Optimization Theory and Applications, vol. 39, No. 2, Feb. 1983, pp. 269–291.

Meirovitch, L., Baruh, H., "The Implementation of Modal Filters for Control of Structures," Journal of Guidance, Control and Dynamics, vol. 8, No. 6, Nov.–Dec. 1985, pp. 707–716.

* cited by examiner

FROM FIG. 1A

TO FIG. 1D

FROM FIG. 1A

TO FIG. 1E

FROM FIG. 1B

TO FIG. 1F

FROM FIG. 1C

TO FIG. 1F

STRUCTURAL CONTROL AND MONITORING USING ADAPTIVE SPATIO-TEMPORAL FILTERING

CROSS-REFERENCE TO RELATED APPLICATION

This application claims the benefit of U.S. Provisional Application Ser. No. 60/073,514, filed Feb. 3, 1998.

GOVERNMENT LICENSE RIGHTS

The U.S. Government has a paid-up license in this invention and the right in limited circumstances to require the patent owner to license others on reasonable terms as provided for by the terms of Contract No. DAAJ02-96-C-0016 awarded by the Department of Defense.

BACKGROUND OF THE INVENTION

1. Field of the Invention

The present invention relates to the field of modal analysis and, more particularly, to a method and apparatus for decomposing a complex multiple degree-of-freedom response of a linear dynamic system into individual component single degree-of-freedom modal responses.

2. Description of the Prior Art

Many physical devices are linear dynamic systems. The vibration, or dynamic response, of linear dynamic systems is often the cause of significant problems in many manufacturing processes and inherently limits the ability of certain machines to perform efficiently. The vibration of linear dynamic systems fundamentally limits the accuracy and resolution of sensing systems, while also causing fatigue failure in structural components and electronic assemblies.

Active monitoring and control of vibration is a solution to the aforementioned problems. While researchers have been investigating active vibration control approaches for many years, there still remains fundamental problems which have prevented the widespread deployment of this technology.

Systems which react to a disturbance input by a single-mode response are termed single degree-of-freedom (SDOF) systems. SDOF systems have just a single resonant peak in their frequency response function (FRF) plots and are much easier to control and monitor than multiple degree-of-freedom (MDOF) systems. Unfortunately SDOF systems occur only rarely and are generally achieved only in contrived laboratory experiments.

The dynamic response of a "real world" linear dynamic system is typically a superposition of the response of a plurality of individual modes of response,—i.e. a MDOF system. Real world systems typically have complex response characteristics with many SDOF modes contributing to their dynamic response and many associated modal, or resonant, peaks in their frequency response function (FRFs) as illustrated in FIG. 1A. It has proven difficult to monitor or control systems with such complex response characteristics using prior art techniques.

The general characteristics of modal decomposition are illustrated in FIGS. 1A–1F. These six figures show frequency response functions (FRFs) plotting the input-output relation of a linear system as a function of frequency. A specific example of a linear dynamic system is a mechanical system such as an aircraft. The input to the system is an applied dynamic force and the output is the vibration amplitude measured at different locations on the aircraft. In FIGS. 1A–1F the vertical axis quantity is magnitude displayed in inches per pound force and is defined as the ratio of vibration response amplitude measured at a specific location on the aircraft to the force amplitude applied at a specific location on the aircraft. The horizontal axis quantity is frequency measured in hertz.

FIG. 1A shows a typical FRF measured on a "real world" system comprising a plurality of superposed SDOF modes of vibration. Each peak in the plot of FIG. 1A is associated with a particular SDOF mode of vibration of the linear dynamic system. For example, peak 2 in FIG. 1A is associated with a first SDOF mode of vibration which is shown decoupled in FIG. 1B. Likewise, peak 4 in FIG. 1A is associated with a second SDOF mode of vibration which is shown decoupled in FIG. 1C.

The response of a linear dynamic system is often measured and used by a control system to modify the behavior of the linear dynamic system. As illustrated in FIGS. 1D and 1E, the first and second SDOF modes of vibration may be controlled such that the magnitudes of their respective peaks 2 and 4 are reduced. After implementation of the modal control, the first and second SDOF modes of vibration may be combined to define the complex MDOF response as illustrated in FIG. 1F.

The response of the linear dynamic system may also be observed by an appropriate monitoring device in order to determine the "state" of the linear dynamic system. The monitoring device may detect damage to the linear dynamic system or other changes in operating characteristics by detecting changes in the frequency, amplitude or damping of the SDOF resonant peaks in the FRF plots. Such observation may be improved and simplified by modal filtering, a generally known technique that decomposes the complex MDOF response of a linear system into signals corresponding to the individual constitutive, SDOF modal responses. However, substantial inaccuracies or impracticalities are associated with previously known modal filtering methods. Additionally, prior art modal filtering methods require an excessive number of sensors in order to perform decomposition, cannot account for phase shifts between different sensor data channels and cannot account for different types of sensors being used in combination.

Modal filtering methods are generally well known in the art and are disclosed in numerous publications including Shelley, S. J., *Investigation of Discrete Modal Filters for Structural Dynamics Applications,* Department of Mechanical and Industrial Engineering, University of Cincinnati, 1990. An improvement to traditional modal filtering techniques, called adaptive modal filtering, utilizes a reference model for calculating modal filter coefficients. Adaptive modal filtering is discussed in many additional publications including, Shelley, S. J., Allemang, R. J., Slater, G. L., Shultze, J. F., *Active Vibration Control Utilizing an Adaptive Modal Filter Based Modal Control Method,* 11$^{th}$ International Modal Analysis Conference, Kissimmee, Fla., Feb. 1–4, 1993. Both of these documents are incorporated herein by reference. While a significant improvement over prior modal filtering techniques, adaptive modal filtering methods still suffer from many of the disadvantages described above.

Accordingly, there is a need for an improved method and apparatus for decomposing MDOF dynamic responses into signals corresponding to the constituent SDOF modal responses of the MDOF linear dynamic system.

SUMMARY OF THE INVENTION

The present invention synthesizes signals corresponding to easily controlled and monitored single degree-of-freedom (SDOF) modal responses by using spatio-temporal filtering to uncouple complicated multiple degree-of-freedom (MDOF) responses measured on real world linear dynamic systems.

The apparatus of the present invention includes at least one sensor, each at least one sensor mounted at a location on a linear dynamic system for generating at least one response isignal representing actual dynamic response of the linear dynamic system at the location. The apparatus also consists of at least one excitation actuator to apply at least one excitation input to the linear dynamic system to generate the dynamic response, and a means for receiving at least one input signal representing at least one excitation input. A data acquisition and processing system periodically samples the response signal at different instances in time, stores a sequence of digitized samples for each sampling of the at least one response signal and associates each digitized sample of the at least one response signal with one of the instances in time. The data acquisition and processing system also periodically samples the at least one excitation input signal in conjunction with the at least one response signal, stores a sequence of digitized samples of the at least one input signal and associates each digitized sample of the at least one input signal with one of the instances in time.

A central data processing unit includes means for reading the digitized samples of the response and input signals and means for calculating therefrom a first set of spatio-temporal filter coefficients. The apparatus further comprises means for generating a first reference model having dynamic characteristics substantially similar to a first single mode of the linear dynamic system, and means for exciting the first reference model in a manner similar to the linear dynamic system thereby producing a first reference modal coordinate response at each of the instances in time.

The first set of spatio-temporal filter coefficients are based upon a plurality of the digitized response signal samples and associated digitized input signal samples. The first set of spatio-temporal filter coefficients have values associated with any one of the instances in time which, when simultaneously applied to a plurality of the digitized samples of the at least one response signal from selected instances in time, will synthesize a signal that substantially matches the first reference modal coordinate response at the one instance in time.

Once the central data processing unit calculates the spatio-temporal filter coefficients a synthesizer applies these coefficients to the response signals. The application of the spatio-temporal filter coefficients to the response signals of the linear dynamic system will synthesize a signal corresponding to a first decoupled SDOF modal response of the linear dynamic system without requiring any additional measurement of the excitation applied to the system As described in the Background of the Invention of the present application, this decoupled SDOF modal response is one of the plurality of individual modal responses which superpose to define the actual MDOF dynamic response of the linear dynamic system. Thus, when the SDOF reference model is excited in a manner similar to the linear dynamic system, the signal synthesized by the spatio-temporal filter corresponds to both the SDOF modal response of the linear dynamic system and also the response of the SDOF reference model.

The central data processing unit further includes means for generating a second reference model having dynamic characteristics substantially similar to a second single mode of the linear dynamic system, and means for exciting the second reference model in a manner similar to the linear dynamic system, thereby producing a second reference modal coordinate response at each of the instances in time. The central data processing unit further comprises means for calculating from the digitized samples of the response signals, a second set of spatio-temporal filter coefficients.

The second set of spatio-temporal filter coefficients are based upon a plurality of the digitized response signal samples and associated digitized input signal samples. The second set of spatio-temporal filter coefficients have values associated with any one of the instances in time which, when simultaneously applied to a plurality of the digitized samples of the at least one response signal from selected instances in time, will synthesize a signal that substantially matches the second reference modal coordinate response at the one instance in time. The synthesizer applies the spatio-temporal filter coefficients to the response signals, thereby generating the synthesized signal corresponding to a second decoupled SDOF modal response of the linear dynamic system.

The central data processing unit may further include means for calculating unlimited additional sets of spatio-temporal filter coefficients in the manner described above with respect to the first and second sets of spatio-temporal filter coefficients. The synthesizer applies the resulting plurality of sets of spatio-temporal filter coefficients to the response signals, thereby generating the synthesized signals corresponding to a plurality of decoupled SDOF modal responses of the linear dynamic system. In this manner, the complex MDOF response of the linear dynamic system may be decoupled into any subset of, or all of its constitutive SDOF modal responses.

The central data processing unit preferably includes means for updating the plurality of sets of spatio-temporal filter coefficients as the response signals are periodically sampled by the data acquisition system.

As noted above, at least one and preferably a plurality of excitation actuators provide at least one excitation input to the linear dynamic system and means are provided for receiving input signals representing at least one excitation input. In the case of multiple excitation inputs the central data processing unit includes means for calculating a set of input influence coefficients based upon the digitized samples of the response and input signals. In such a case the reference model consists of multiple subcomponent reference models, wherein the number of subcomponent reference models is equal to the number of excitation inputs. Each subcomponent reference model is identical to the other, however each is excited in response to a different excitation input signal, and thereby generates a different subcomponent reference modal coordinate response. The set of input influence coefficients have values which, when summed together after being applied individually to the plurality of separate subcomponent reference modal coordinate responses, correspond to an analytical representation of the SDOF modal response of a subject mode of the linear dynamic system. In other words, the input influence coefficients represent the degree to which each input to the system excites the subject mode of the linear dynamic system. Means are provided for generating a set of control force vectors in response to said set of input influence coefficients.

A modal controller is preferably defined by the central data processing unit for generating a modal control signal in response to the first synthesized signal corresponding to the first decoupled SDOF modal response of the linear dynamic system.. A plurality of modal controllers may be defined by the central data processing unit for generating a plurality of modal control signals in response to a plurality of synthesized signals corresponding to a plurality of decoupled SDOF modal responses. In the case of a plurality of excitation actuators the modal control signal is expanded to a plurality of control input signals by multiplying each modal control signal by the set of control force vectors. An actuator power unit independently controls each actuator in response to the control input signals.

The method of the present invention includes the steps of exciting a linear dynamic system, generating at least one excitation input signal representing the actual excitation input to the linear dynamic system, generating at least one response signal representing actual response at a location on the linear dynamic system, periodically sampling the at least one response signal and the at least one excitation input signal to produce a series of digitized samples thereof, and storing the series of digitized samples. The method further comprises the step of processing the digitized samples of the input and response signals to produce a first set of spatio-temporal filter coefficients, the first set being based upon a plurality of the digitized samples of the at least one response signal. The first set of spatio-temporal filter coefficients have values associated with any one of said instances in time which, when simultaneously applied to a plurality of the digitized samples of the response signals, will generate a signal substantially matching a response from a first SDOF reference model being excited in a manner similar to the linear dynamic system. The spatio-temporal filter coefficients are applied to the digitized samples of response signals, thereby generating the synthesized signal corresponding to the decoupled SDOF modal response of the linear dynamic system.. The set of spatio-temporal filter coefficients are updated as the response signals are periodically sampled. The method may further comprise the steps of processing the digitized samples to simultaneously calculate a plurality of sets of spatio-temporal filter coefficients and then applying the coefficients to the response signals.

The step of exciting the linear dynamic system comprises applying at least one excitation input to the linear dynamic system. In the case of multiple excitation inputs the method of the present invention further comprises the steps of generating a set of input influence coefficients having values which, when summed together after being applied individually to the separate subcomponent reference modal coordinate responses, forms an analytical representation of the SDOF modal response of a subject mode of the linear dynamic system. A set of control force vectors are generated in response to the set of input influence coefficients. A modal control signal is generated in response to the first SDOF system response and expanded into a plurality of control input signals by multiplying the modal control signal by the set of control force vectors. The excitation inputs are controlled independently in response to the control input signals.

Therefore, it is an object of the invention to provide a method and apparatus for decomposing with great accuracy complex MDOF responses of linear dynamic systems into synthesized signals corresponding to decoupled constituent SDOF modal responses of the linear dynamic system.

It is a further object of the invention to provide such a method and apparatus requiring a minimal number of sensors in order to decompose the MDOF response.

It is another object of the invention to provide such a method and apparatus which accommodates different types of sensors and phase shifts in the sensors.

It is still yet another object of the invention to provide a method and apparatus for calculating a plurality of spatio-temporal filter coefficients from a plurality of time delayed successive samples of response signals representing actual responses of the linear dynamic system and successive samples of at least one excitation input signal.

It is another object of the invention to provide a method and apparatus for calculating spatio-temporal filter coefficients which decompose the complex MDOF response of a linear dynamic system while accounting for multiple input forces exciting the linear dynamic system.

It is a further object of the invention to provide a method and apparatus for calculating a plurality of input influence coefficients from a plurality of time delayed successive samples of response signals representing responses of the linear dynamic system and a plurality of samples of excitation signals representing the excitation inputs to the linear dynamic system.

Other objects and advantages of the invention will be apparent from the following description, the accompanying drawings and the appended claims.

DESCRIPTION OF THE PREFERRED EMBODIMENT

Figure 1A:
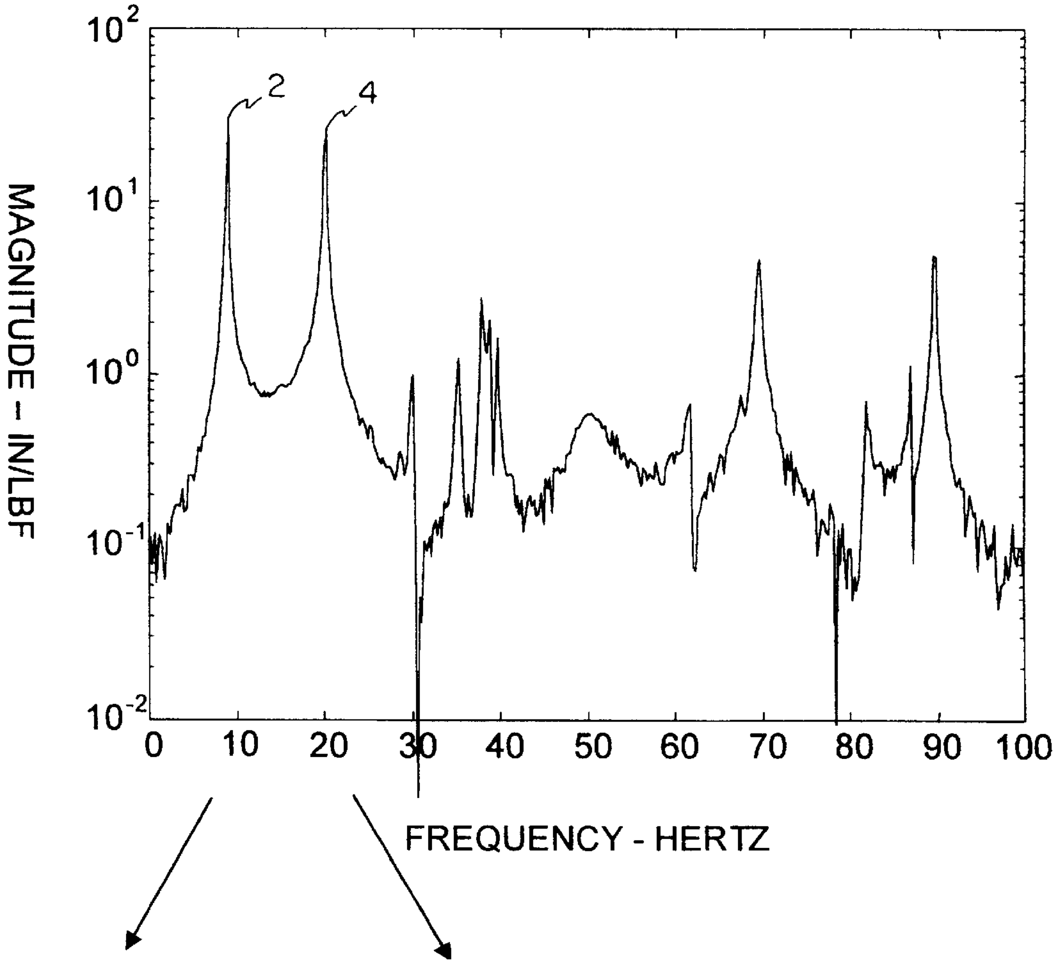
FIG. 1A PRIOR ART
FIG. 1A is an illustration of a prior art multiple-degree-of-freedom (MDOF) frequency response function of a linear dynamic system.
Figure 1B:
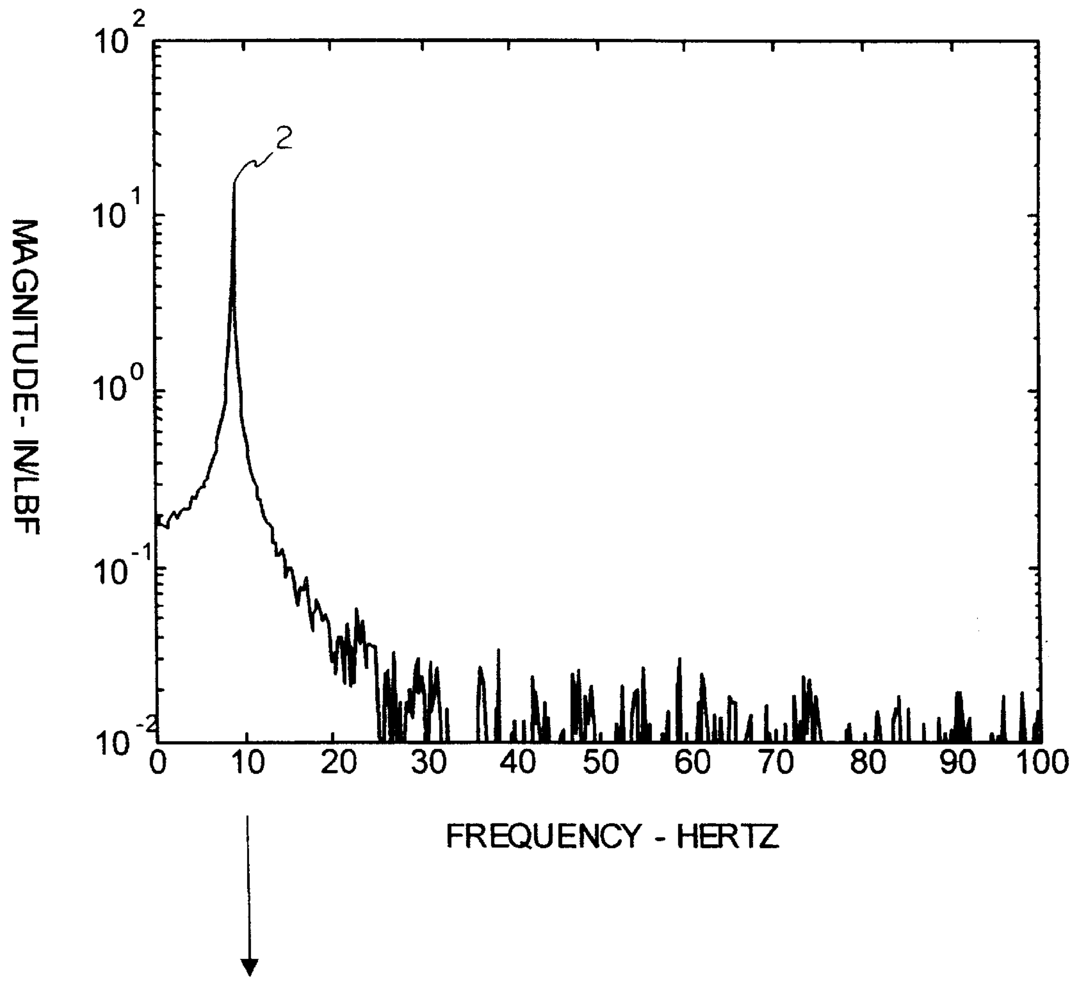
FIG. 1B PRIOR ART
FIG. 1B is an illustration of a prior art first single-degree-of-freedom (SDOF) frequency response function extracted from the frequency response function of FIG. 1A.
Figure 1C:
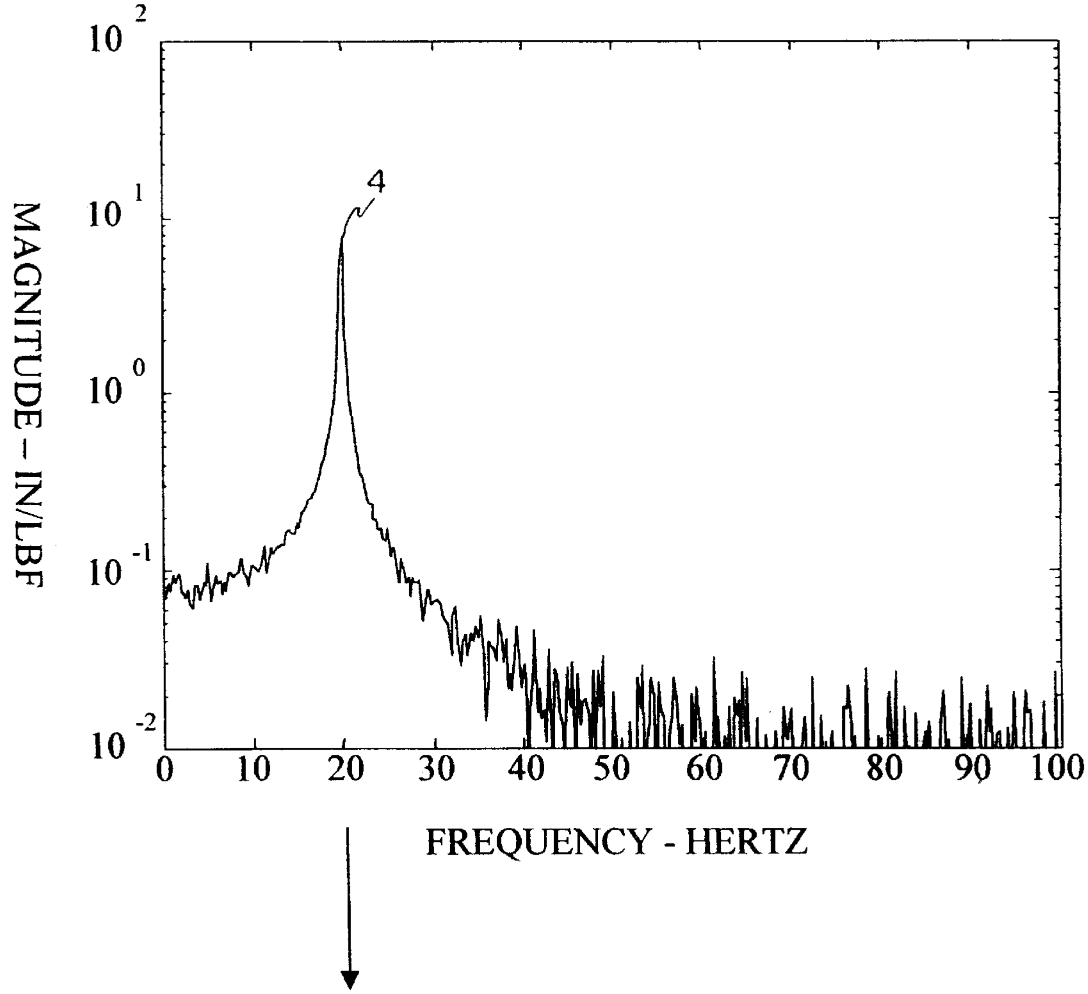
FIG. 1C PRIOR ART
FIG. 1C is an illustration of a prior art second SDOF frequency response function extracted from the frequency response function of FIG. 1A.
Figure 1D:
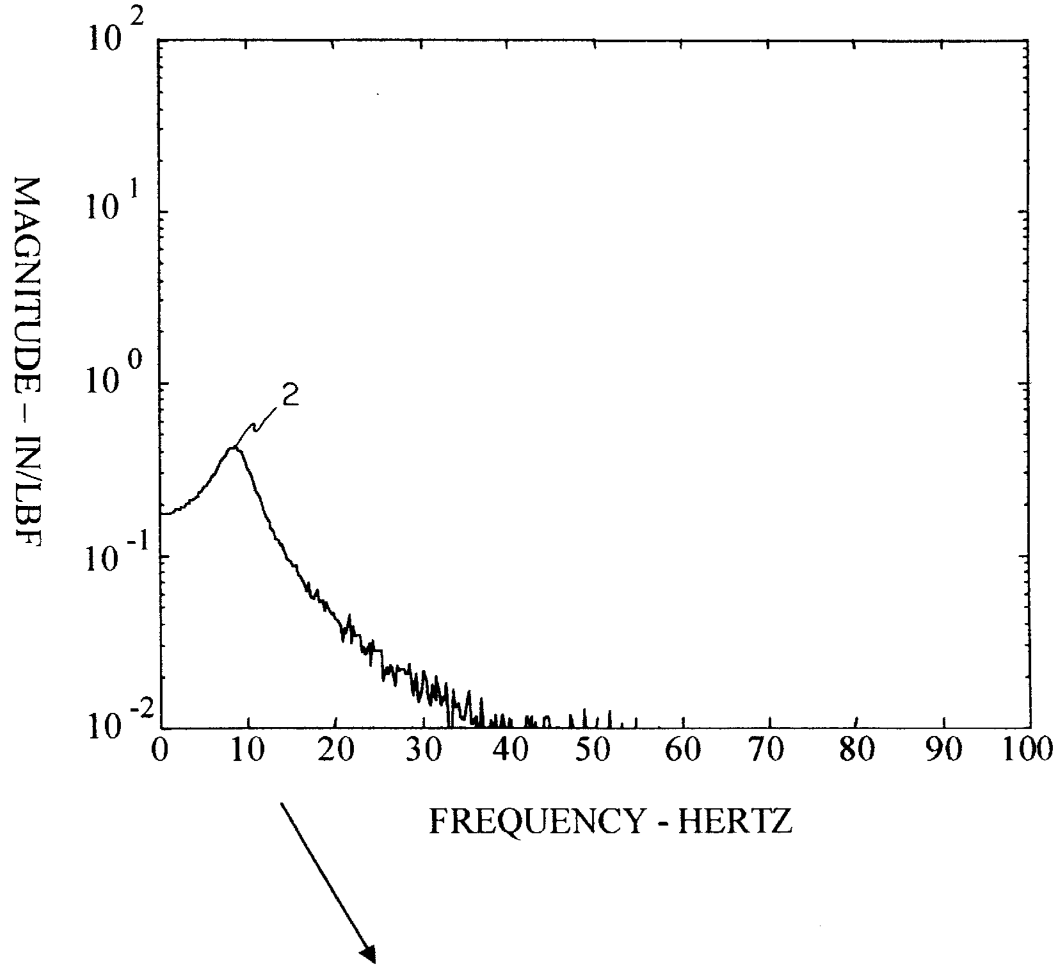
FIG. 1D PRIOR ART
FIG. 1D is an illustration of the prior art frequency response function of FIG. 1B after reduction by a modal control system.
Figure 1E:
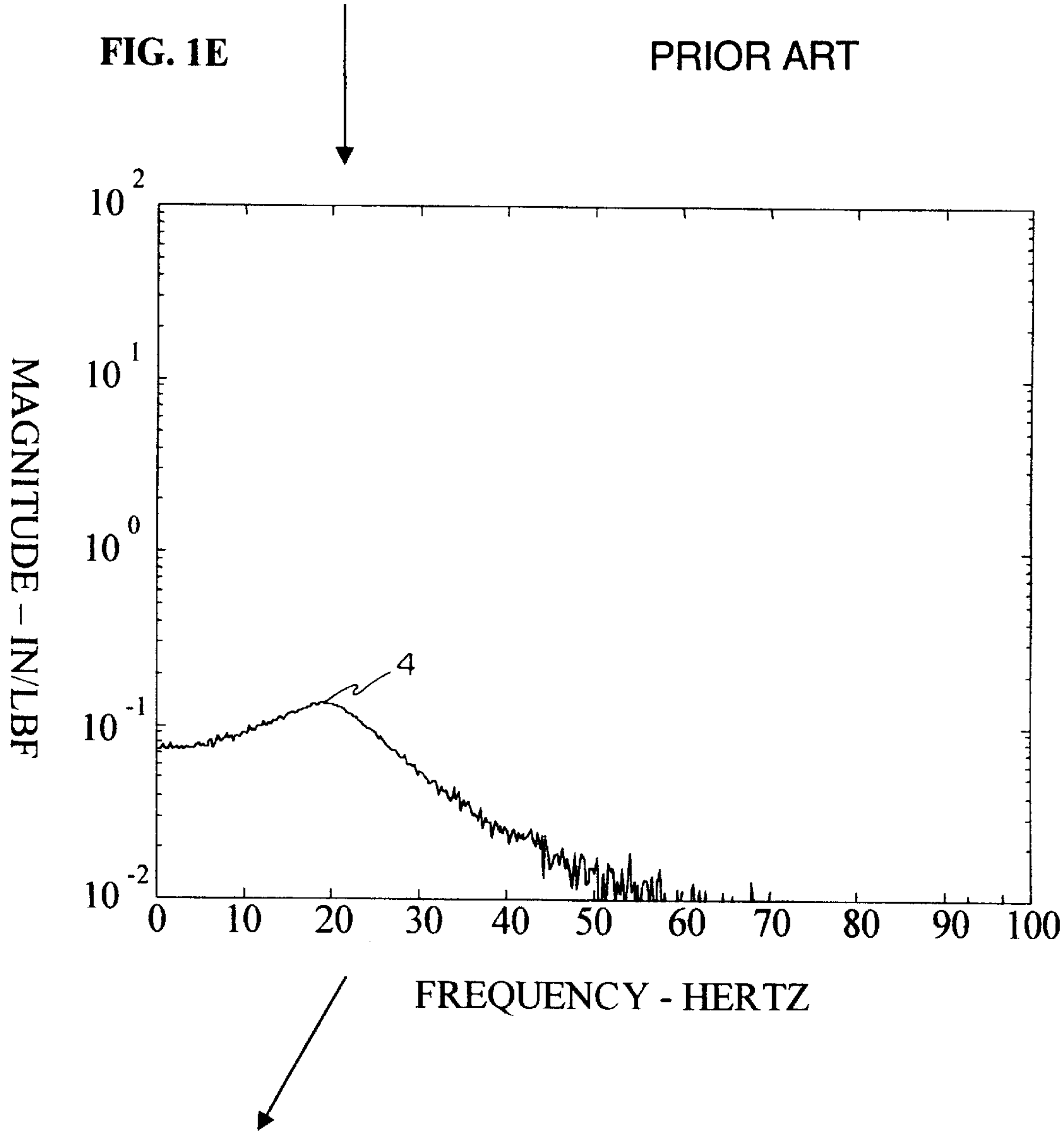
FIG. 1E PRIOR ART
FIG. 1E is an illustration of the prior art frequency response function of FIG. 1C after reduction by a modal control system.
Figure 1F:
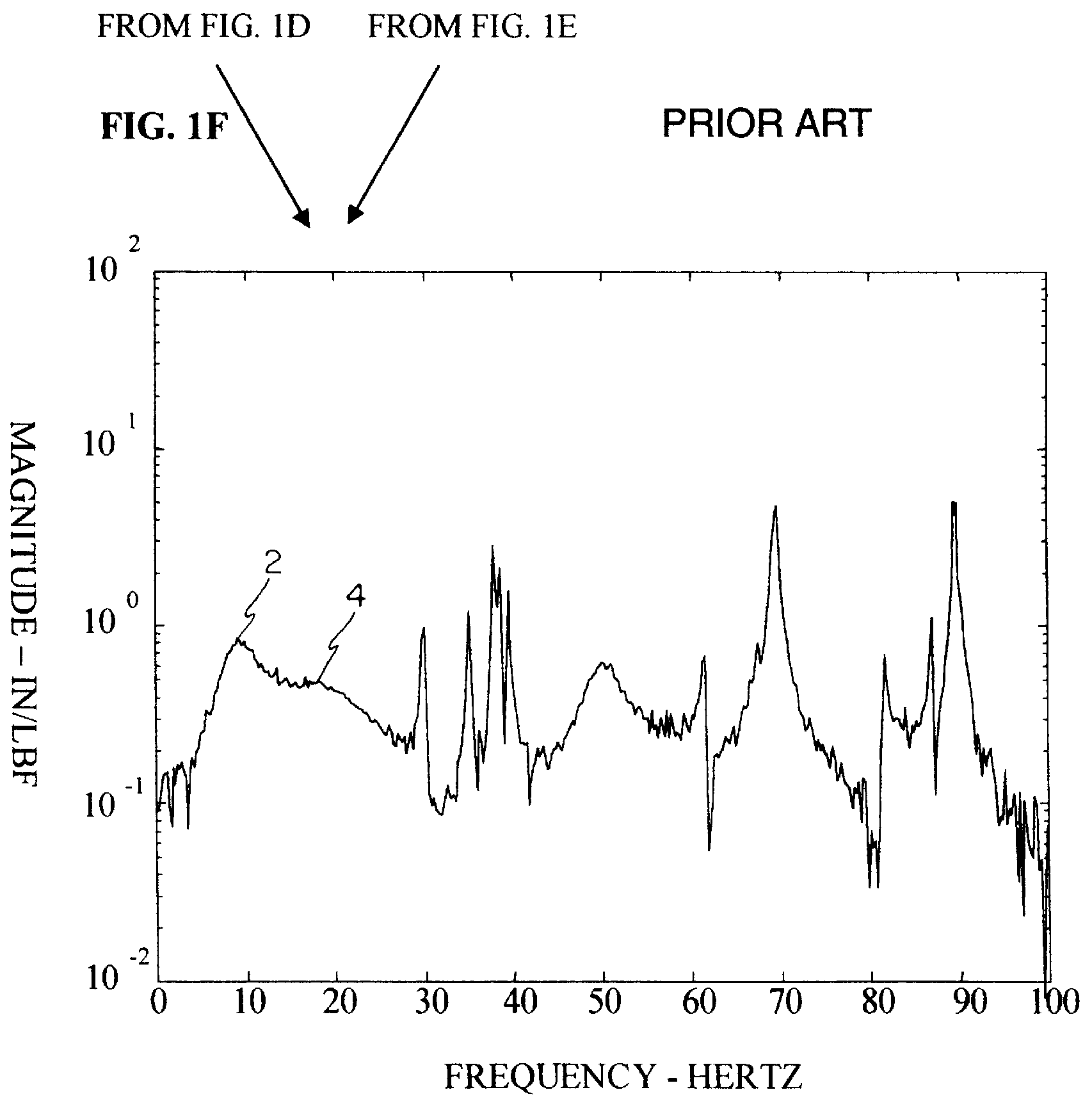
FIG. 1F PRIOR ART
FIG. 1F is an illustration of a prior art frequency response function corresponding to FIG. 1A and resulting from implementation of the modal control illustrated in FIGS. 1D and 1E.
Figure 2A:
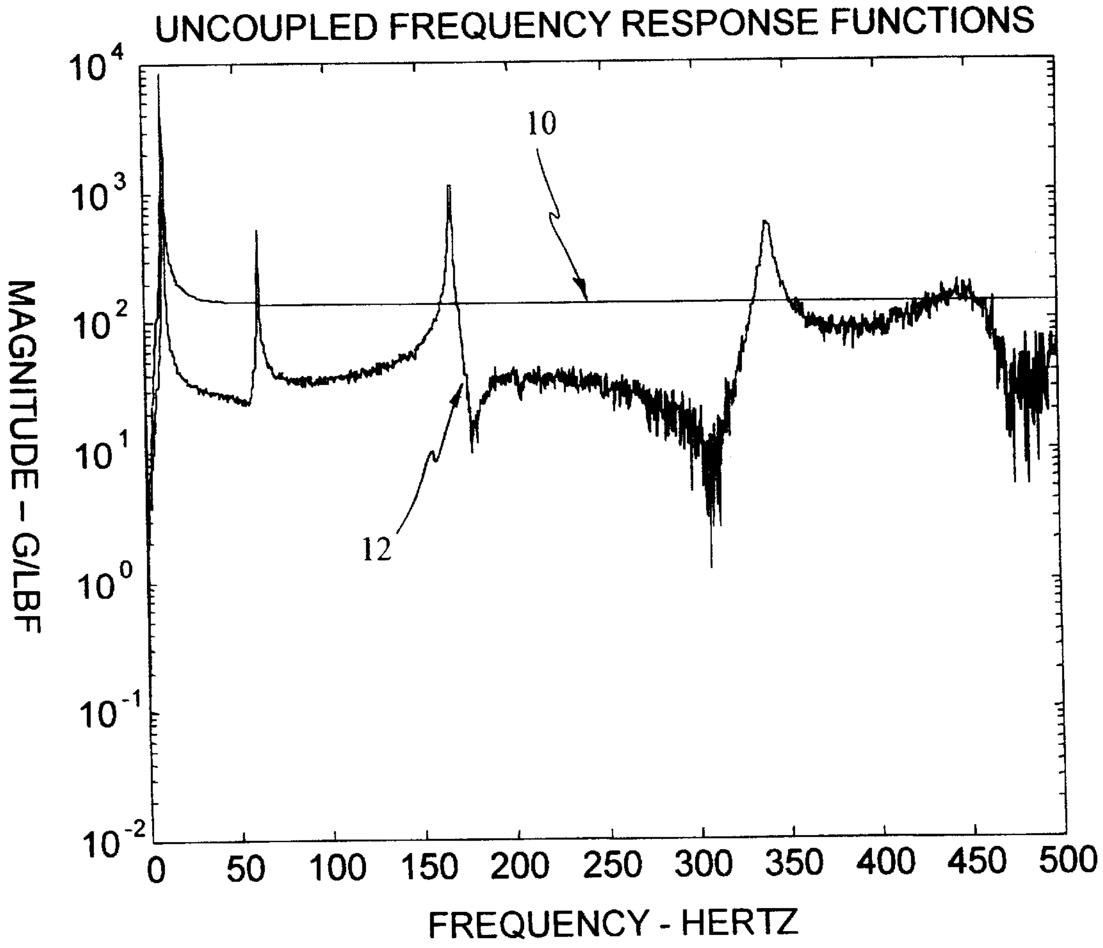
FIG. 2A PRIOR ART
FIG. 2A is an illustration comparing an analytically defined first SDOF frequency response function and a corresponding first SDOF frequency response function generated by a prior art modal filter.
Figure 2B:
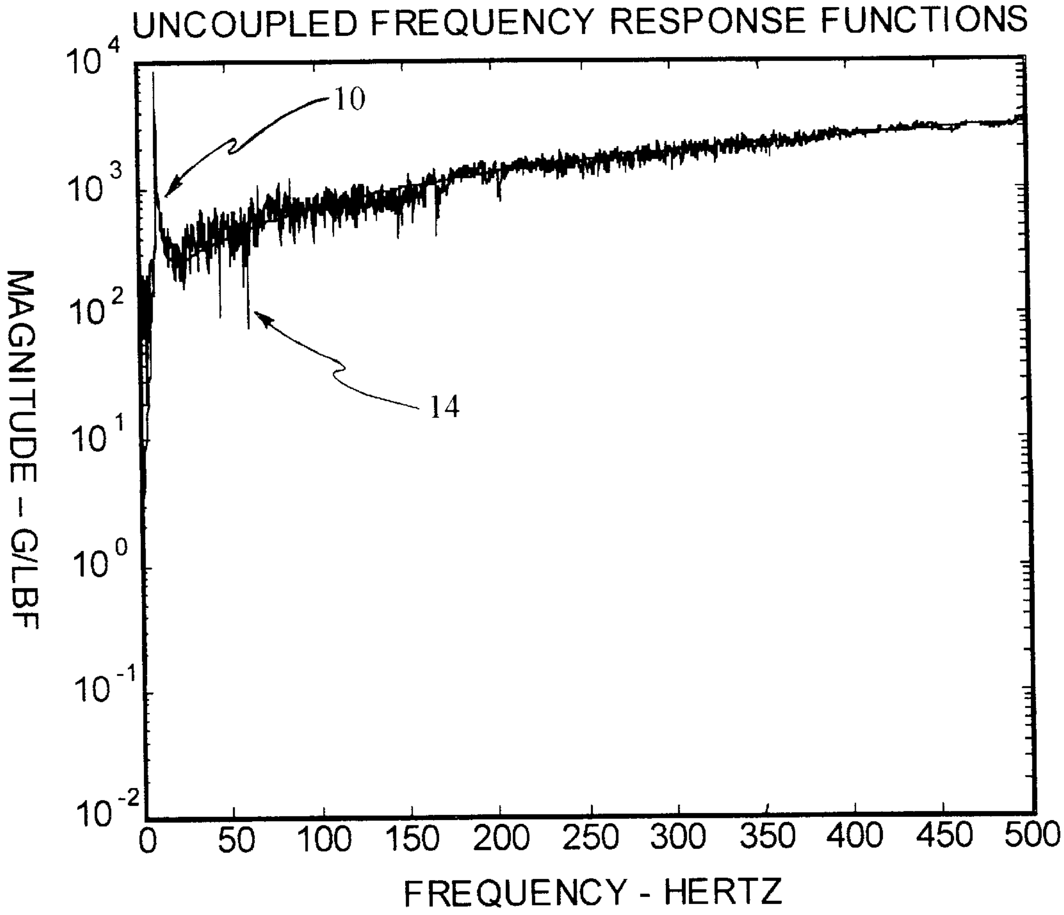
FIG. 2B is an illustration comparing an analytically defined first SDOF frequency response function and a corresponding first SDOF frequency response function generated by a spatio-temporal filter of the present invention.
Figure 3A:
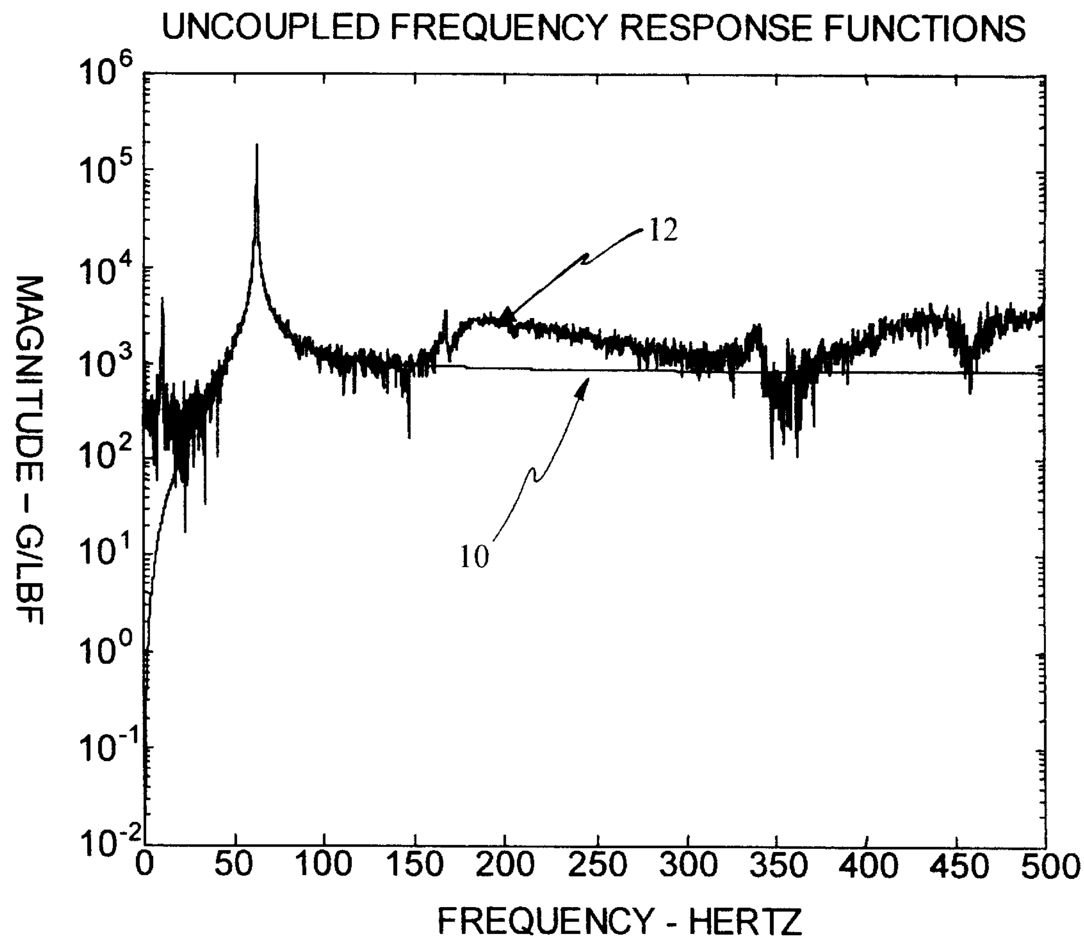
FIG. 3A PRIOR ART
FIG. 3A is an illustration comparing an analytically defined second SDOF frequency response function and a corresponding second SDOF frequency response function generated by a prior art modal filter.
Figure 3B:
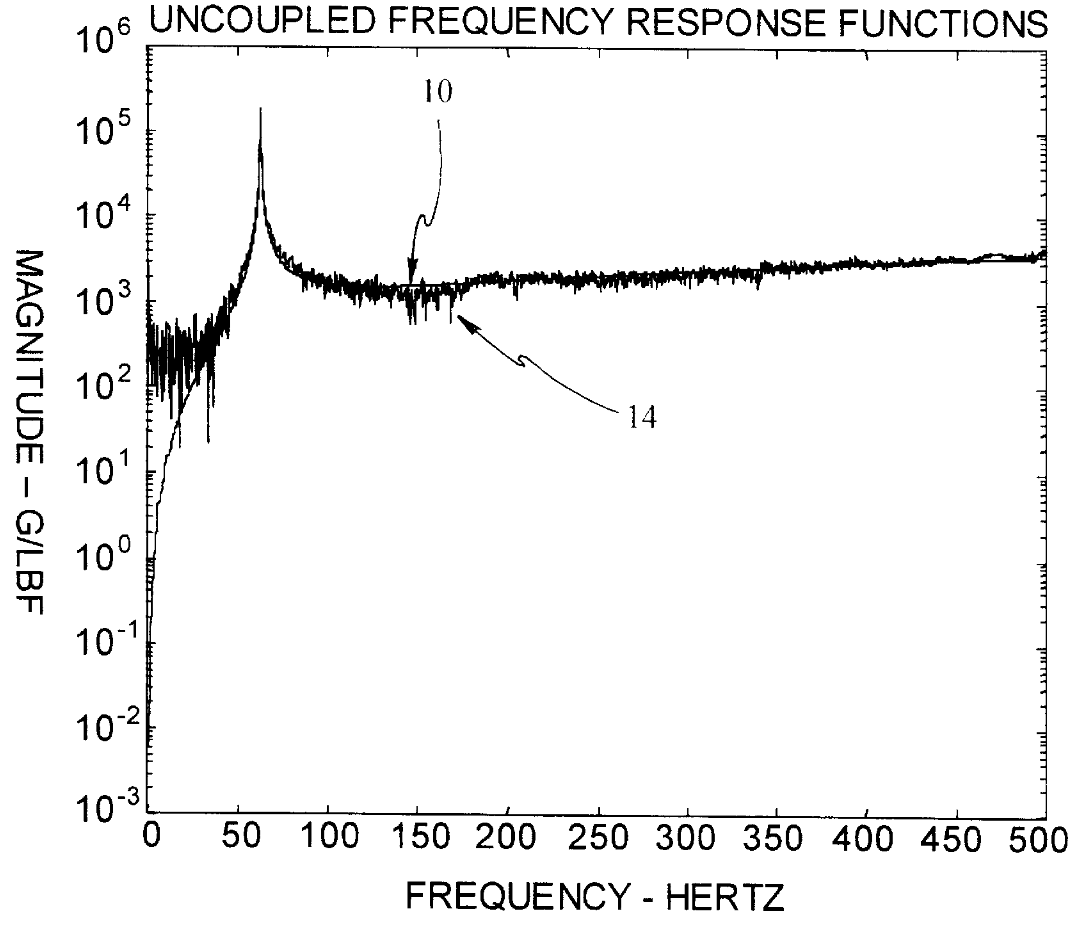
FIG. 3B is an illustration comparing an analytically defined second SDOF frequency response function and a corresponding second SDOF frequency response function generated by a spatio-temporal filter of the present invention.
Figure 4A:
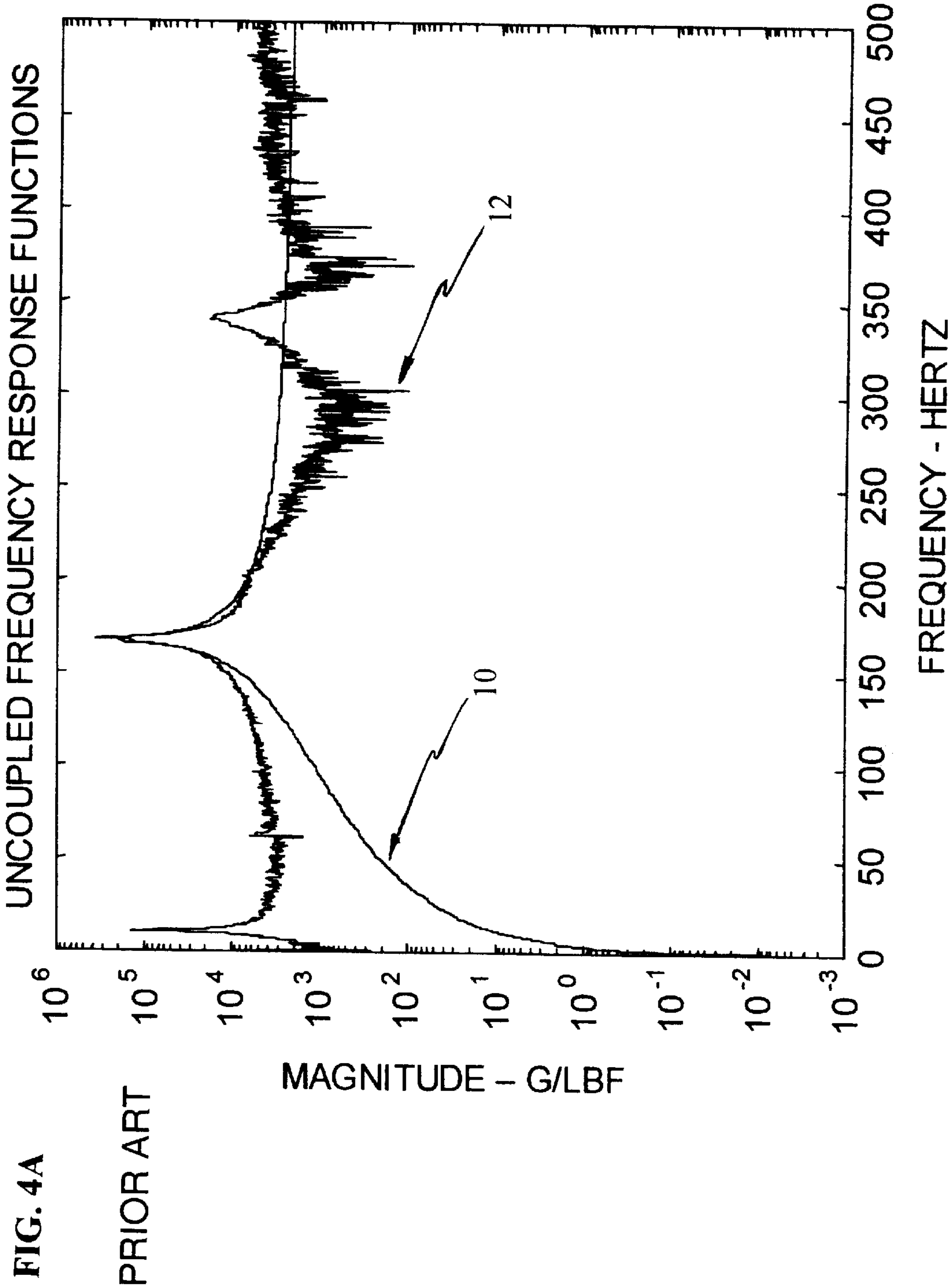
FIG. 4A PRIOR ART
FIG. 4A is an illustration comparing an analytically defined third SDOF frequency response function and a corresponding third SDOF frequency response function generated by a prior art modal filter.
Figure 4B:
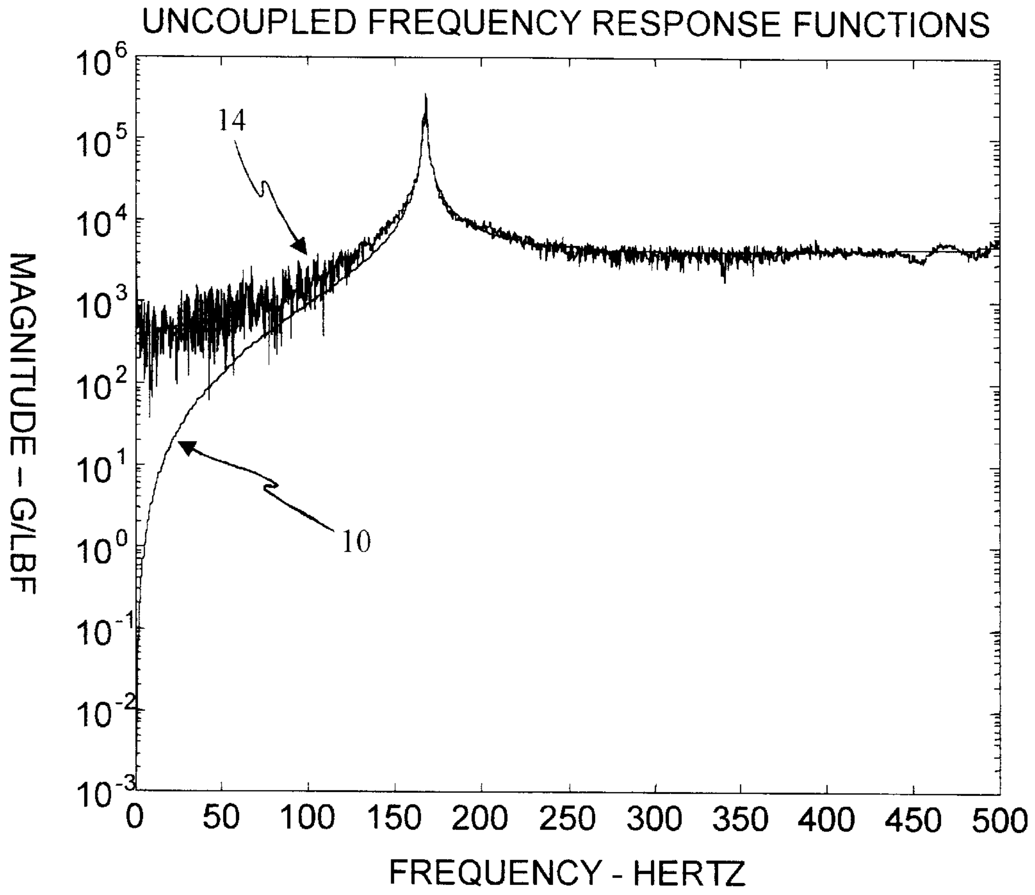
FIG. 4B is an illustration comparing an analytically defined third SDOF frequency response function and a corresponding third SDOF frequency response function defined by a spatio-temporal filter of the present invention.

Referring initially to FIGS. 2A through 4B, these drawings illustrate the superior results which may be achieved by the spatio-temporal filtering (STF) method of the present invention over conventional modal filtering methods. FIGS. 2A, 3A and 4A illustrate the results obtained from the prior art methods of modal filtering as represented by frequency response functions (FRFS). FIGS. 2B, 3B and 4B illustrate the results, by the way of frequency response functions, of spatio-temporal filtering in accordance with the present invention.

Referring further to FIGS. 2A through 4B, the raw response data is experimentally measured vibration readings taken on a cantilevered beam with three accelerometers and a piezoelectric strain sensor. The raw response data represents a complex multiple-degree-of-freedom (MDOF) response of the structure. It is desired to decompose the complex MDOF response into at least one signal representing one of its constituent single-degree-of-freedom (SDOF) modal responses. It may be appreciated that while a cantilevered beam is used for illustrative purposes, the method and apparatus of the present invention may find equal applicability with any linear system. While a linear system is used with the method and apparatus of the present invention, it is to be understood that in nature linear systems are an ideal concept and that the invention may be used with any system that may be approximated as a linear system.

FIGS. 2A and 2B represent the frequency response function for a first mode of the structure, FIGS. 3A and 3B represent frequency response functions for a second mode of the structure, and FIGS. 4A and 4B represent the frequency response functions for a third mode of the structure. As noted above, the prior art modal filter results are illustrated in FIGS. 2A, 3A and 4A, while the spatio-temporal filter results are shown in FIGS. 2B, 3B and 4B.

In each of FIGS. 2A through 4B, two plots are overlaid. One plot is a smooth solid line 10 that represents the perfect analytical SDOF response. In FIGS. 2A, 3A and 4A, the second plot is a noisy or jagged line 12 that represents the synthesized signal produced by the conventional modal filter. Similarly, in FIGS. 2B, 3B and 4B, the second plot is a noisy or jagged line 14 representing the synthesized signal produced by the spatio-temporal filter of the present invention. The accuracy of both the conventional modal filter and the spatio-temporal filter of the present invention is determined by how closely the frequency response function of the signal synthesized by the filters 12, 14 matches the analytical SDOF frequency response function 10. As clearly evident from FIGS. 2A through 4B, in all three modes the response signal 14 synthesized by the spatio-temporal filter of the present invention is vastly superior to the response signal 12 synthesized by the conventional modal filter. In other words, the signal synthesized by the spatio-temporal filter much more closely corresponds to the actual SDOF modal response of the physical system as represented by the analytical SDOF response as illustrated in FIGS. 2A–4B.

Implementation

Figure 5:
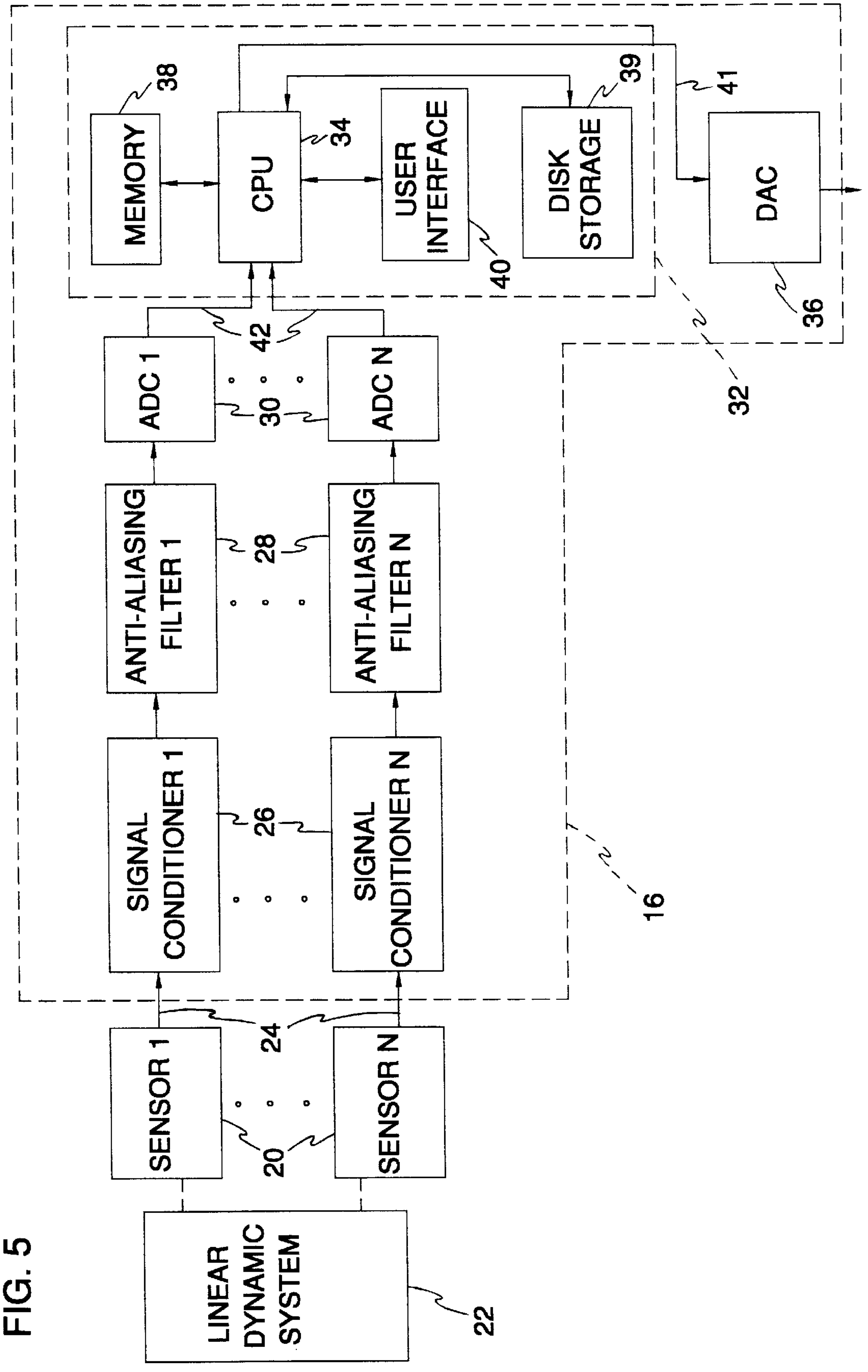
FIG. 5 is a block diagram illustrating a digital data acquisition and processing system for use with the method of the present invention.
Figure 6:
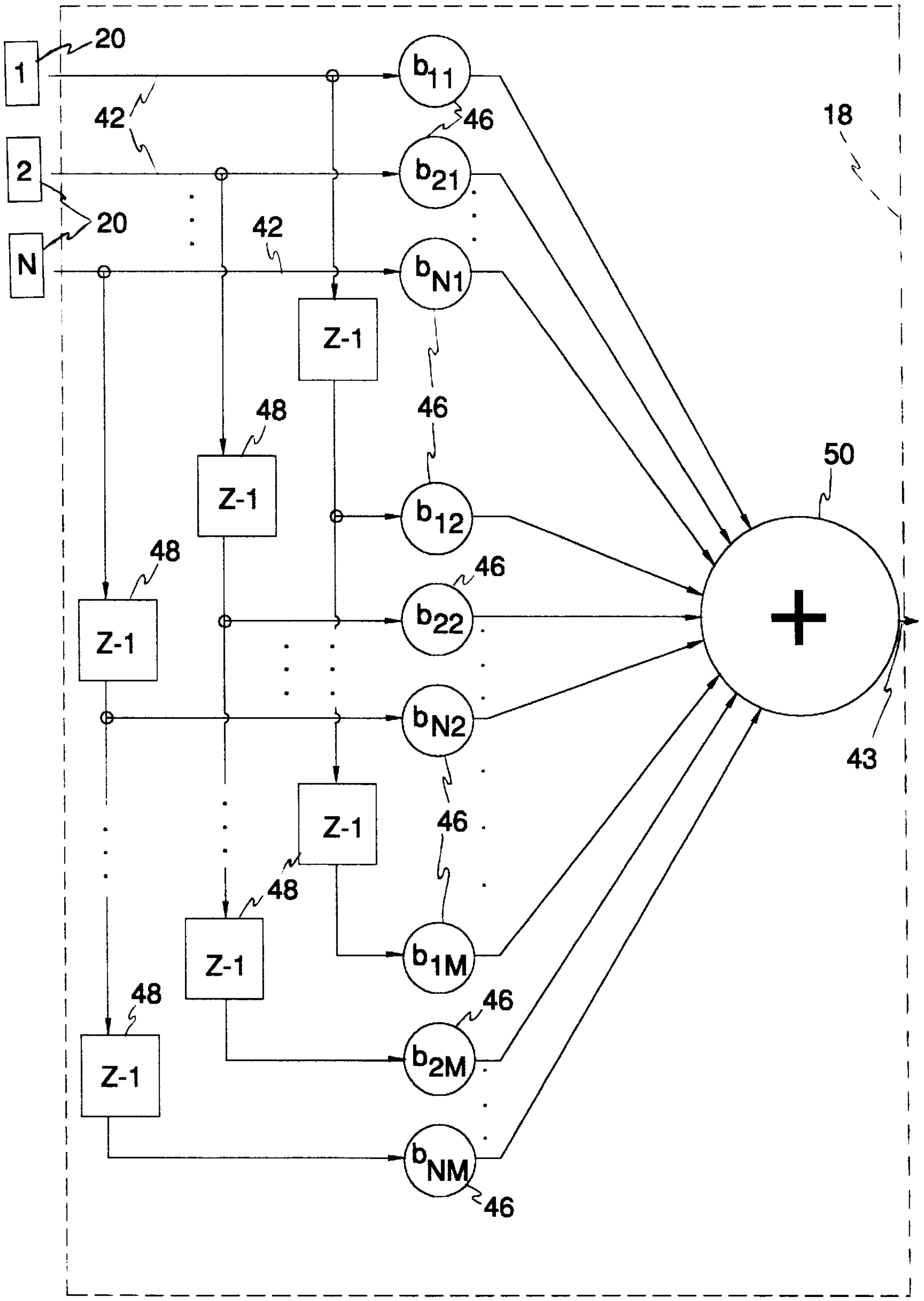
FIG. 6 is a block diagram illustrating of the operation of a single spatio-temporal filter to synthesize a signal corresponding to a decoupled SDOF modal response of a linear dynamic system.

Referring now to FIGS. 5 and 6 of the preferred embodiment of the present invention, a digital data acquisition and processing system 16 is utilized for implementing the spatio-temporal filter 18 of the present invention. The digital data acquisition and processing system 16 is of the type well known in the art and may comprise any of a wide variety of conventional general purpose systems which are commercially available. Any similar system which converts analog signals into digital data values in a computer which can then be processed as described below is suitable to implement the spatio-temporal filtering method of the present invention.

Alternatively, the spatio-temporal filter 18 may be implemented in an analog system comprising a combination of differentiators, amplifiers with variable gains, and summers.

A plurality of sensors 20 are preferably provided at spaced locations on a linear dynamic system 22, the response of which is to be measured. However, the method and apparatus of the present invention would find applicability with the use of a single sensor 20. The linear system 22 may consist of a mechanical system such as a vehicle, machine tool or instrument. Alternatively, the linear system 22 may consist of a structural system such as a highway bridge, or could consist of an electrical network. It should be appreciated that similar linear dynamic systems 22 may be readily substituted therefore and would find equal applicability with the method and apparatus of the present invention.

Referring further to FIG. 5, the reference letter N is a variable representing the total number of sensors 20 which measure response on the linear system 22. For a mechanical or structural system, the sensors 20 are in communication with the data acquisition and processing system 16 for providing response signals 24 thereto. The response signals 24 are indicative of motion or response of the linear system 22 and, more particularly, provide a measure of the magnitude of response over time. The sensors 20 may comprise motion or strain sensors such as accelerometers, velocity sensors, displacement sensors, metal foil or piezoelectric strain sensors, etc. However, the sensors 20 are not limited to the above illustrative list and may comprise any device providing an indication of motion or response of the linear system.

For electrical systems, the response signals 24 may comprise electrical voltages measured at different locations in the electrical circuit which are then communicated to the digital data acquisition and processing system 16. Regardless of the linear system 22 being monitored, the sensors 20 themselves are well known in the art and merely provide the response signals 24 containing the data for a predetermined time period which the spatio-temporal filter 18 processes.

Associated with the N sensors 20 are N sets of signal conditioning electronics 26, anti-aliasing filters 28 and analog to digital converters (ADCs) 30, all of which form part of the digital data acquisition and processing system 16 of FIG. 5. The digital data acquisition and processing system 16 preferably further includes a computer or digital signal processor (DSP) 32 and digital to analog converter (DAC) 36 in communication with the digital signal processor 32. The digital signal processor 32 comprises a central data processing unit (CPU) 34 in communication with a memory 38, a disk storage 39 and a user interface 40. Once again, the central data processing unit 34, memory 38, disk storage 39 and user interface 40 may comprise any of a wide variety of commercially available components.

It may be appreciated that other configurations of the digital data acquisition and processing system 16 are possible. For instance, the signal conditioning electronics 26 may not be required depending on the type of sensors 20 used and the type of linear system 22 from which the response signals 24 arise. Anti-aliasing filters 28 may not be required for certain types of analog to digital converters 30 such as delta-sigma ADCs. In addition, some systems 16 may not require an analog to digital converter 30 for each sensor 20. It is also possible that one analog to digital converter 30 may be shared between multiple sensors 20 by sampling each in sequence or by using a sample and hold multiplexer.

The analog to digital converters 30 sample the analog response signals 24 at different instances in time, and preferably at regular time intervals, typically hundreds or thousands of times per second. The converters 30 then convert the instantaneous amplitudes, or magnitudes, of the response signals 24 to digitized samples 42 having data values which the computer or digital signal processor 32 incorporated within the digital data acquisition and processing system 16 can process. Once the response signals 24 have been converted to digitized samples 42 by the analog to digital converters 30, they are passed to the central data processing unit 34 of the computer or digital signal processor 32. In the computer or digital signal processor 32, the data values of the digitized samples 42 are operated upon by the spatio-temporal filter 18 to uncouple the MDOF responses into synthesized signals 43 corresponding to decoupled SDOF modal responses of the linear dynamic system. The spatio-temporal filter 18 multiplies and sums the data values of the digitized samples 42 in a specific manner with specific parameters to generate the synthesized signals 43 corresponding to the decoupled SDOF modal responses of the linear system 22. The CPU 34 then transmits a signal 41 representing the decoupled SDOF responses to the DAC 36 where it is converted to an analog signal for control or monitoring purposes.

Referring further to FIG. 6, the processing performed in a synthesizer 44, which preferably comprises part of the central processing unit 34, to implement the spatio-temporal filter 18 to synthesize a signal 43 corresponding to a decoupled SDOF modal response is illustrated in detail. Circles 46 represent parameters $b_{ij}$ which are multiplied by the values of the digitized response samples 42. A square 48 containing the term $Z^{-1}$ indicates a unit delay. The data value of the digitized sample 42 on the downstream side of each square 48 is the data value of the digitized sample 42 from the last processing cycle or instance in time. A circle 50 containing a + sign indicates summation of all values entering the circle 50. As illustrated in FIG. 6, the spatio-temporal filter 18 comprises the plurality of parameters $b_{ij}$ as represented by circles 46, the unit delays $Z^{-1}$ as represented by squares 48, and the summation of all values as represented by circle 50. In the preferred embodiment, there are N data values passed to the central processing unit 36 from the analog to digital converters 30 each sample cycle, or instance in time. These N data values correspond to the instantaneous amplitude of the sensor response signals 24 at each of the sampled instances in time.

As illustrated in FIG. 6, there are N times M parameters or values which are referred to as spatio-temporal filter coefficients $b_{ij}$. As noted above, the combined coefficients $b_{ij}$ together with the delay operations 48 and the summation process 50 define the spatio-temporal filter 18. Appropriate values for the parameters $b_{ij}$ are determined as described hereinbelow and are stored in the memory 38 to be available for the spatio-temporal filter calculation. Note that the spatio-temporal filter 18 is not related to a conventional bandpass filter. The output of the spatio-temporal filter 18 contains responses across the entire frequency band rather than just in a bandpass frequency range.

In addition to the most recently measured digitized sample data values 42, the digitized sample data values 42 measured during the previous M−1 ADC sample cycles, or instances in time, are also retained in memory 38. This results in N times M digitized sample data values 42 which are multiplied by the N time M spatio-temporal filter coefficients $b_{ij}$ and summed to form a spatio-temporal filter output 43. The output 43 of the spatio-temporal filter 18 is a synthesized signal which corresponds to the decoupled SDOF modal response of the single mode of interest. The response of all the other modes which are contained in the sensor response signals 24 have been removed.

Figure 7:
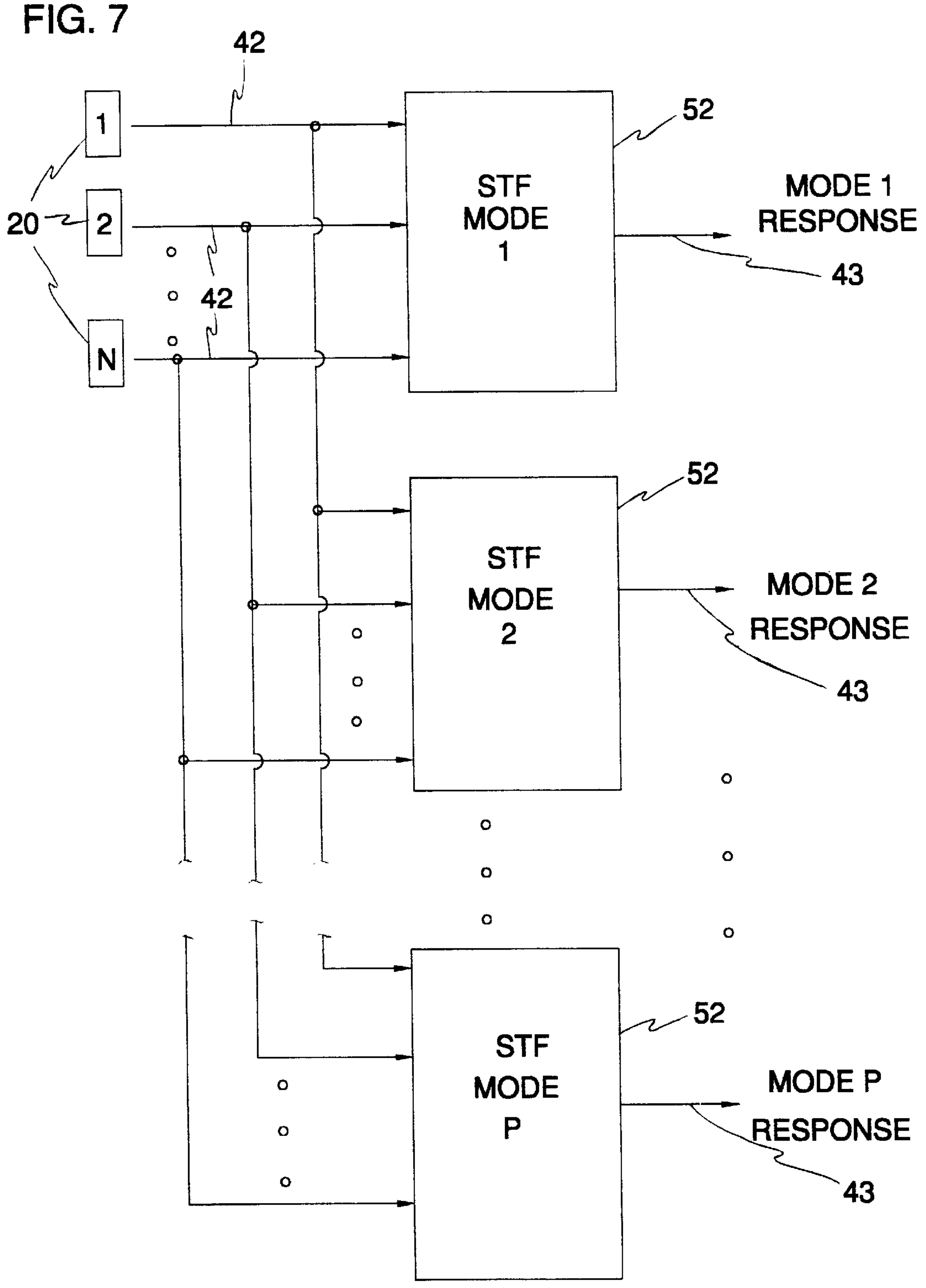
FIG. 7 is a block diagram illustrating a plurality of the single spatio-temporal filters of FIG. 6 operating in parallel.

FIG. 6 details the implementation of a single spatio-temporal filter 18 to synthesize a signal 43 which corresponds to the response of a single mode of the linear dynamic system. However, as illustrated in FIG. 7, multiple spatio-temporal filters 18 may be implemented in parallel using the same digital data acquisition and processing system 16 and the same sensor response signals 24. This allows as many different decoupled SDOF single mode responses, as represented by the synthesized signals 43, to be extracted as are desired. Each STF block 52 in FIG. 7 represents the processing described in FIG. 6, but with different spatio-temporal filter coefficients $b_{ij}$ defining different spatio-temporal filters 18 calculated to synthesize a plurality of signals 43 corresponding to different decoupled SDOF modal responses.

Calculation of Spatio-Temporal Filter Coefficients

The above discussion details the method of implementing the spatio-temporal filter 18 once the spatio-temporal filter coefficients $b_{ij}$ are known. A significant component of the present invention is the method by which the spatio-temporal filter coefficients $b_{ij}$ are calculated. In the present invention a "reference model" method or approach is used to calculate the spatio-temporal filter coefficients $b_{ij}$. This method may be performed in the time domain or in the frequency domain. In either solution domain, the solution may be done in an off-line batch manner, in an off-line adaptive manner, or in an on-line adaptive manner.

The preferred embodiment of the present invention performs the solution in an on-line adaptive manner. In this embodiment the data acquisition and processing system 16, the central processing unit 34 and the synthesizer 44 are integrally formed as a single unit. As such the measuring and storing of the digitized samples 42 of the input and response signals 44, the calculating of the spatio-temporal filter coefficients $b_{ij}$ and the application of the spatio-temporal coefficients $b_{ij}$ to the response signals 24 to synthesize the signal 43 corresponding to the decoupled SDOF modal response of the linear dynamic system 22 are all performed in the same apparatus.

An alternative embodiment of the present invention performs the solution in an off-line batch manner or an off-line adaptive manner. In this embodiment the data acquisition and processing system 16, the central processing unit 34 and the synthesizer 44 may consist of independent units or may be combined in any manner to form two or fewer units.

Any of the above described solution approaches are valid for either discrete time spatio-temporal filter implementations using a digital data acquisition and processing system 16 or continuous time spatio-temporal filter implementations using combinations of variable gain amplifiers, differentiaters and summers in an analog electrical circuit.

The reference model approach of the present invention for calculating spatio-temporal filter coefficients $b_{ij}$ is a distinct improvement over the prior art reference model approach for calculating modal filter coefficients which is well known in the art. The prior art reference model method of calculating conventional modal filter coefficients is discussed in numerous references including Shelley, S. J., *Investigation of Discrete Modal Filters for Structural Dynamics Applications,* Department of Mechanical and Industrial Engineering, University of Cincinnati, 1990, and Shelley, S. J., Allemang, R. J., Slater, G. L., Schultze, J. F., *Active Vibration Control Utilizing an Adaptive Modal Filter Based Modal Control Method,* $11^{th}$ International Modal Analysis Conference, Kissimmee, Fla., Feb. 1–4, 1993, the disclosures of which are incorporated herein by reference. The reference model method of the present invention provides many improvements over the prior art methods, including the process of calculating spatio-temporal filter coefficients $b_{ij}$ and accommodating the case where multiple forces are applied to the linear system 22.

Figure 8:
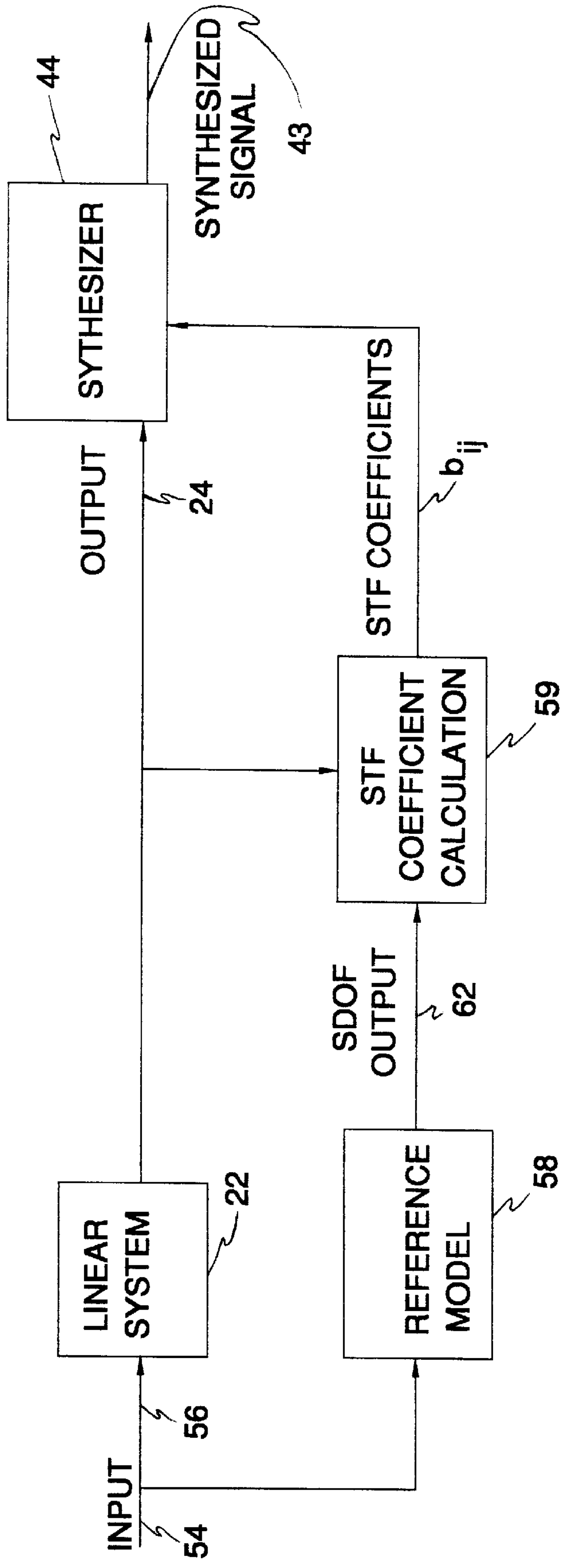
FIG. 8 is a block diagram illustrating the method of calculating spatio-temporal filter coefficients and applying the coefficients to synthesize a signal which corresponds to the decoupled SDOF modal response of the linear dynamic system.

Referring now to FIG. 8, the reference model method of the present invention for calculating spatio-temporal coefficients $b_{ij}$ uses measures of the input 54 which is exciting the dynamic system 22 and knowledge of the pole value of the mode of interest to calculate the STF coefficients $b_{ij}$. The components in FIG. 8 include the linear dynamic system 22 for which STF filters 18 will be used. As mentioned earlier, the linear dynamic system 22 could comprise a mechanical system such as a vehicle, machine tool or instrument, a structural system such as a highway bridge, or an electrical network. The input 54 applied to the system 22 is the excitation which results in a dynamic output. In the case of a mechanical or structural system the input 54 is generally an applied dynamic force or forces. The input 54 can be a single force or multiple forces applied at different locations on the system 22. In an electrical network the input 54 is typically a voltage or current. The input signal 56 can be the output of a force sensor measuring the force applied to the linear system, the output of a pressure sensor measuring hydraulic pressure in the case of a hydraulic actuator, a voltage proportional to current supplied to an electromagnetic force actuator in the case of an electromagnetic force actuator, a voltage output from the DAC 36 of the digital data and acquisition system 16 to control a force actuator, or the internal digital command 41 to the DAC 36 used to control a force actuator. It should be appreciated that this is not an exhaustive list and the input signal 56 can be provided by any number of conventional sensing means.

Referring further to FIG. 8, the output 24 of the system 22 is a measurement of its dynamic response. In a mechanical or structural system, the output 24 is generally measured displacement, velocity, acceleration or strain. It may be appreciated however that other measurements of response indicative of motion are possible. In an electrical network the output 24 may comprise measurements of voltage or current. The output 24 can be a single measurement of response or multiple measurements measured at different locations on a structure or at different points in an electrical circuit.

The reference model 58 is an analytical representation of the mode of the linear system 22 for which STF coefficients $b_{ij}$ are being calculated. The reference model 58 may be implemented as an analog electrical network or in a digital form in a digital computer. The digital form is the preferred embodiment in most cases. The reference model 58 is formed using the frequency and damping of the mode of interest. There are many known methods to calculate the frequency and damping of modes of linear systems 22. The most practical method is to experimentally measure input and output data 56 and 24 and conduct curve fitting or parameter estimation to estimate the frequency and damping for the modes of interest. These curve fitting or parameter estimation techniques are well known to those skilled in the art of modal analysis. In an alternative embodiment of the invention the frequency and damping of the modes of the linear system 22 may also be estimated with analytical modeling techniques such as finite element analysis.

The STF coefficient calculation procedure as represented by block 59 solves for a set of STF coefficients $b_{ij}$ which, when applied to the measured output response 24 by the synthesizer 44, will result in a SDOF response 43 which substantially matches the SDOF response 62 generated by the reference model 58. The reference model 58 has the dynamic characteristics of the linear dynamic system 22 and, more particularly, is a theoretical representation of the response of one mode of the linear dynamic system 22. There are many different approaches to achieve this solution. As mentioned earlier, such solution may be performed for continuous or discrete time, in the frequency or time domains, and in an off-line batch mode, in an off-line adaptive mode or in an on-line adaptive mode.

The discrete time, time domain implementations of the reference model determination of the STF 18 are the preferred embodiments in most cases. The off-line batch mode and on-line adaptive mode of generating STF coefficients $b_{ij}$ for discrete time, time domain implementation of the STF 18 will be discussed in detail below.

Off-line Batch Solution

Both the input and the output 54 and 24 of the linear system 22 are preferably measured with the digital data acquisition and processing system 16, resulting in digitized samples 42 stored in the memory 38 and representing the amplitudes, or magnitudes, of the input and output signals 54 and 56 at the sampling instances in time. The following discussion assumes that the system 22 of interest is a structure and the inputs and outputs 54 and 24 are applied forces and measured motion responses, respectively. This does not limit the applicability of the following discussion, however. As noted above, the method and apparatus of the present invention is applicable to any linear system 22.

In the following discussion, measured applied forces and response quantities will be generally identified by reference numeral 56 and 24. Each individual force and response data value measured at a particular instant in time will be denoted by $f_k$ and $x_k$ respectively. The subscript k refers to the time sample number. If the data is sampled at a time interval of Δt, $f_{k-1}$ refers to an input which was applied to the linear system Δt prior to $f_k$. Both $f_k$ and $x_k$ may be column vector quantities, the element in each row representing the force or response applied or measured at a particular location on the structure or system 22. For clarity in presenting the approach, and to distinctly separate the multiple input STF calculation procedure which is one of the improvements over existing technology which this invention comprises assume initially that only one force is applied to the system 22. There are, however, generally multiple responses measured. These force and response signals 56 and 24 are measured at q instants in time and arranged in matrix form as below;

$$F_k=[f_k\, f_{k-1}\, \ldots\, f_{k-1+q}] \tag{1}$$

$$\hat{X}_k=[x_k x_{k-1}\, \ldots\, x_{k-q+1}] \tag{2}$$

Recall that the response term, $x_k$, is generally a vector of responses measured at N different points on the system 22 of interest;

$$x_k = \begin{Bmatrix} x_k^{(1)} \\ x_k^{(2)} \\ \vdots \\ x_k^{(N)} \end{Bmatrix} \tag{3}$$

Considering this, Equation (2) may be written in more detail as;

$$\hat{X}_k = \begin{bmatrix} x_k^{(1)} & x_{k-1}^{(1)} & & x_{k-q+1}^{(1)} \\ x_k^{(2)} & x_{k-1}^{(2)} & & x_{k-q+1}^{(2)} \\ \vdots & \vdots & \cdots & \vdots \\ x_k^{(N)} & x_{k-1}^{(N)} & & x_{k-q+1}^{(N)} \end{bmatrix} \tag{4}$$

If the STF 18 is to use M time taps (data from M instants in time—corresponding to FIG. 6) a matrix of stacked, time shifted responses is assembled as follows;

$$X_k = \begin{bmatrix} \hat{X}_k \\ \hat{X}_{k-1} \\ \vdots \\ \hat{X}_{k-M+1} \end{bmatrix} \tag{5}$$

Equation (5) consists of M versions of Equation (4) each incrementally time shifted by one sample and stacked below the other. This results in;

$$X_k = \begin{bmatrix} \begin{Bmatrix} x_k^{(1)} \\ x_k^{(2)} \\ \vdots \\ x_k^{(N)} \end{Bmatrix} & \begin{Bmatrix} x_{k-1}^{(1)} \\ x_{k-1}^{(2)} \\ \vdots \\ x_{k-1}^{(N)} \end{Bmatrix} & \cdots & \begin{Bmatrix} x_{k-q+1}^{(1)} \\ x_{k-q+1}^{(2)} \\ \vdots \\ x_{k-q+1}^{(N)} \end{Bmatrix} \\ \begin{Bmatrix} x_{k-1}^{(1)} \\ x_{k-1}^{(2)} \\ \vdots \\ x_{k-1}^{(N)} \end{Bmatrix} & \begin{Bmatrix} x_{k-2}^{(1)} \\ x_{k-2}^{(2)} \\ \vdots \\ x_{k-2}^{(N)} \end{Bmatrix} & \cdots & \begin{Bmatrix} x_{k-q}^{(1)} \\ x_{k-q}^{(2)} \\ \vdots \\ x_{k-q}^{(N)} \end{Bmatrix} \\ \vdots & \vdots & & \vdots \\ \begin{Bmatrix} x_{k-M+1}^{(1)} \\ x_{k-M+1}^{(2)} \\ \vdots \\ x_{k-M+1}^{(N)} \end{Bmatrix} & \begin{Bmatrix} x_{k-M}^{(1)} \\ x_{k-M}^{(2)} \\ \vdots \\ x_{k-M}^{(N)} \end{Bmatrix} & \cdots & \begin{Bmatrix} x_{k-M+1-q}^{(1)} \\ x_{k-k-M+1-q}^{(2)} \\ \vdots \\ x_{k-k-M+1-q}^{(N)} \end{Bmatrix} \end{bmatrix} \tag{6}$$

$X_k$ has N times M rows (where N in the number of measured response signals and M is the number of time taps) and q columns.

The measured force, $F_k$, is applied to the reference model to generate a corresponding SDOF reference modal coordinate response, $N_k$ as described in greater detail herein below;

$$N_k=[\eta_k\eta_{k-1}\, \ldots\, \eta_{k-q+1}] \tag{7}$$

The desired vector of STF filter coefficients $b_{ij}$ is ψ, representing the spatio-temporal filter 18, where;

$$\psi = \begin{Bmatrix} b_{11} \\ b_{21} \\ \vdots \\ b_{N1} \\ b_{12} \\ b_{22} \\ \vdots \\ b_{N2} \\ \vdots \\ b_{1M} \\ b_{2M} \\ \vdots \\ b_{NM} \end{Bmatrix} \tag{8}$$

The coefficients in ψ correspond to the coefficients $b_{ij}$ in FIG. 6. Thus the task is to calculate ψ such that;

$$\psi^H X_k=N_k \tag{9}$$

When ψ is applied to the matrix of time shifted response data, or digitized samples 42, the result is a synthesized signal 43 corresponding to the decoupled SDOF response of the particular mode of interest of the linear system 22 which also substantially matches the SDOF response 62 of the reference model 58 . The 'H' superscript on ψ denotes hermetian or complex conjugate transpose.

Equation (9) may be transposed to form a least squares problem which may be solved for ψ;

$$X_k^T\psi^* =N_k^T \tag{10}$$

The number of time samples, q, used for the calculation is chosen to be larger than N times M, so Equation (10) may be solved in a least squares fashion for the STF coefficients $b_{ij}$.

Multiple Input Off-line Batch Solution

In the multiple input case, more than a single input 54, or force in the example of a structural system, is applied to the linear system 22 of interest. In such a case, input influence coefficients must also be determined to account for the different degree to which each force drives the mode of interest. Such input influence coefficients are often termed modal participation factors in the experimental modal analysis field. These input influence coefficients are solved for simultaneously with the STF coefficients $b_{ij}$. The multi-input approach to solving for STF coefficients $b_{ij}$ is a novel approach which comprises part of the invention disclosed herein.

Figure 9:
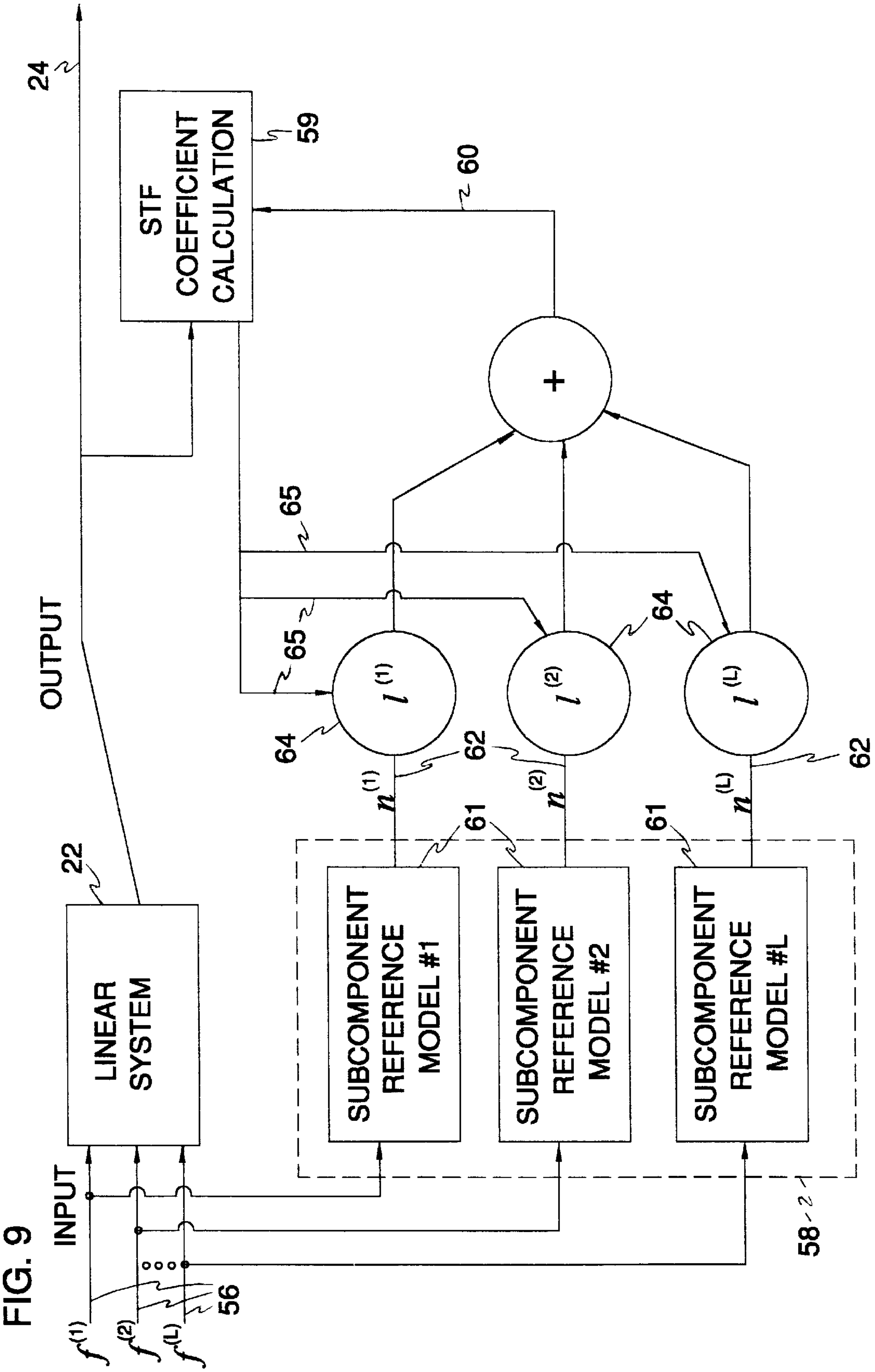
FIG. 9 is a block diagram illustrating a multiple input reference model method of the present invention for determining spatio-temporal filter coefficients and input influence coefficients.

Turning now to the multiple input case of FIG. 9, a separate but identical subcomponent reference model 61 is created for each of a quantity L measured force inputs 56. The subcomponent reference models 61 in combination with the input influence coefficients l are considered to define the reference model 58 of FIG. 8. In the single input case, a single input influence coefficient l is assumed to be equal to unity and therefore a single subcomponent reference model 61 is equal to the reference model 58. Each of these identical L subcomponent reference models 61 is driven by a different measured force signal 54 creating L SDOF reference modal coordinate response signals 62. These L reference modal coordinate responses 62 are multiplied by an associated (and initially unknown) input influence coefficient, $l^{(1)}$ through $l_{(L)}$ and summed to form the total SDOF reference modal coordinate response 60. In FIG. 9, the circles 64 represent application of the input influence coefficients l to the subcomponent reference modal coordinates response signals 62. The input influence coefficients l are, however, unknown and are calculated simultaneously with the STF filter coefficients ψ as indicated by process lines 65 in FIG. 9.

Incorporating this multi-input structure, Equation (9) becomes;

$$\psi^H X_k = \begin{Bmatrix} l^{(1)} \\ l^{(2)} \\ \vdots \\ l^{(L)} \end{Bmatrix} \begin{bmatrix} N_k^{(1)} \\ N_k^{(2)} \\ \vdots \\ N_k^{(L)} \end{bmatrix} = N_k \tag{11}$$

Equation (11) can be rearranged to;

$$\begin{Bmatrix} \psi \\ l^{(1)} \\ l^{(2)} \\ \vdots \\ l^{(L)} \end{Bmatrix}^H \begin{bmatrix} X_k \\ N_k^{(1)} \\ N_k^{(2)} \\ \vdots \\ N_k^{(L)} \end{bmatrix} = 0 \tag{12}$$

Transposing as before and taking the conjugate yields;

$$\begin{bmatrix} X_k \\ N_k^{(1)} \\ N_k^{(2)} \\ \vdots \\ N_k^{(L)} \end{bmatrix}^H \begin{Bmatrix} \psi \\ l^{(1)} \\ l^{(2)} \\ \vdots \\ l^{(L)} \end{Bmatrix} = 0 \tag{13}$$

Equation (13) can be solved in a total least squares manner for the STF coefficients $b_{ij}$ and the input influence coefficients l. Alternatively, one of the individual subcomponent reference modal coordinate responses 62 may be brought to the right hand side of Equation (13), and the corresponding input influence coefficient l normalized to one. This reduces the problem to a standard least squares problem. For instance, if $l^{(1)}$ is normalized to one, Equation (13) becomes;

$$\begin{bmatrix} X_k \\ N_k^{(2)} \\ \vdots \\ N_k^{(L)} \end{bmatrix}^H \begin{Bmatrix} \psi \\ l^{(2)} \\ \vdots \\ l^{(L)} \end{Bmatrix} = N_k^{(1)H} \tag{14}$$

Forming the Reference Model

The single-degree-of-freedom (SDOF) reference model 58 used in the calculation of STF coefficients $b_{ij}$ is formed from knowledge of the pole, $\lambda=\sigma+j\omega_d$ (resonant frequency and modal damping) associated with the mode that the STF 18 is to extract. The reference model 58 is a discrete time, state space model. This state space model representation is well known to one knowledgeable in the controls field and is documented in most control oriented text books and publications. A discrete time, state space model is of the form;

$$q_{k+1}=A_d q_k+B_d f_k$$

$$\eta_k=C_d q_k+D_d f_k \tag{15}$$

where $f_k$ is the input excitation applied to the system (in the case of a structure this is applied force). The subscripts on the variables, $f_k$, $q_k$ and $\eta_k$ in Equation (15) indicate time sample number in discrete time. $q_k$ is the state vector which defines the state of the system and $\eta_k$ is the output or measured quantity. $A_d$, $B_d$, $C_d$ and $D_d$ the state space system matrices which comprise the reference model. At each time instant, k, the reference model state and output is updated by performing the matrix multiplication in Equation (15). The resulting output time history, $\eta_k$ is the reference modal coordinate used for calculating STF coefficients $b_{ij}$.

The pole, $\lambda=\sigma+j\omega_d$, which is required to form the reference model 58 is generally estimated experimentally from measured input and output system data. The identification techniques used to acquire this data and process it to obtain the pole values are standard techniques which are well known to those in the field. These techniques are documented in many publications and are well known to those skilled in the art.

To form the reference model 58 the state space matrices in Equation (15), $A_d$, $B_d$, $C_d$, and $D_d$ must be determined. Two classes of reference model 58 may be utilized depending upon the characteristics of the system for which STF 18 will be utilized. Real normal mode or proportionally damped systems can utilize a normal mode or second order reference model. The reference modal coordinate in this case is a real number. Complex mode or non-proportionally damped systems require a complex, first order reference model 58. The reference modal coordinate in this case is a complex number. For either the real normal mode or complex mode reference model classes, reference models 58 can be constructed to generate either displacement, velocity or acceleration (real normal mode model only) types of output.

For both the real normal and complex models, the procedure for determining the discrete time, state space coefficient matrices is the same. The continuous time state space matrices are determined first and then transformed to a discrete time form using standard mathematical techniques.

Real Normal Reference Model—$2^{nd}$ Order

Generally, the symbol η (eta) is used to denote modal coordinate. The equation of motion of a second order system in one variable is;

$$\ddot{\eta}m+\dot{\eta}c+\eta k=f \tag{16}$$

The poles of this system are determined by taking the LaPlace transform of Equation (16) and solving using the quadratic equation;

$$\begin{aligned}\lambda &= \frac{-c \pm \sqrt{c^2-4mk}}{2m} \\ &= \frac{-c}{2m} \pm j\sqrt{\frac{k}{m}-\left(\frac{c}{2m}\right)^2} \\ &= \sigma \pm j\sqrt{\omega_n^2-\sigma^2} \\ &= \sigma \pm j\omega_d\end{aligned} \tag{17}$$

By dividing Equation (16) by m, it may be expressed in terms of its pole value and the parameter m, its modal mass;

$$\begin{aligned}&\ddot{\eta}m+\dot{\eta}c+\eta k=f \\ &\ddot{\eta}+\dot{\eta}\frac{c}{m}+\eta\frac{k}{m}=\frac{1}{m}f \\ &\ddot{\eta}-2\sigma\dot{\eta}+\omega_n^2\eta=\frac{1}{m}f\end{aligned} \tag{18}$$

The 1/m scaling term on the input force, f, may be removed from the reference model 58 since it merely scales the amplitude of the reference modal coordinate. This amplitude scaling is accounted for when the STF is applied to control or monitoring applications. This results in the following continuous time representation of the reference model 58;

$$\ddot{\eta}-2\sigma\dot{\eta}+\omega_n^2\eta f \tag{19}$$

Equation (19) can be put into continuous time state space form by adding an auxiliary dummy equation, $\dot{\eta}=\dot{\eta}$;

$$\dot{\eta}=\dot{\eta}$$

$$\ddot{\eta}=\dot{\eta}2\sigma-\eta\omega_n^2+f$$

$$\begin{aligned}&\begin{Bmatrix}\dot{\eta}\\ \ddot{\eta}\end{Bmatrix}=\begin{bmatrix}0 & 1\\ -\omega_n^2 & 2\sigma\end{bmatrix}\begin{Bmatrix}\eta\\ \dot{\eta}\end{Bmatrix}+\begin{bmatrix}0\\1\end{bmatrix}f \\ &\begin{Bmatrix}\dot{\eta}\\ \ddot{\eta}\end{Bmatrix}=A_c\begin{Bmatrix}\eta\\ \dot{\eta}\end{Bmatrix}+B_cf\end{aligned} \tag{20}$$

Thus the continuous time reference model state space matrices $A_c$ and $B_c$ are defined as;

$$\begin{aligned}A_c&=\begin{bmatrix}0 & 1\\ -\omega_n^2 & 2\sigma\end{bmatrix} \\ B_c&=\begin{bmatrix}0\\1\end{bmatrix}\end{aligned} \tag{21}$$

In this case η and $\dot{\eta}$ are the state variables. This continuous time system can be converted to discrete time using a number of standard mathematical transformations. Most commonly a Zero Order Hold transformation has been used. This process is preferably performed utilizing, for instance, Matlab Control Systems Toolbox, available from The Mathworks, Inc. of Natick, Mass. 01760 through the "c2d" (continuous to discrete) function. This function utilizes the continuous time Ac and Bc matrices and the discrete time sample period, dT to calculate the discrete time system matrices Ad and Bd;

$$[Ad,\ Bd]=c2d(Ac,\ Bc,\ dT) \tag{22}$$

For the discrete time state space reference system in Equation (22) to output a displacement modal coordinate system the Cd and Dd matrices and the resulting output are;

$$\begin{aligned}&C_d=[1\quad 0] \\ &D_d=[0] \\ &\eta_k=[1\quad 0]\begin{Bmatrix}\eta_k\\ \dot{\eta}_k\end{Bmatrix}+[0]f_k\end{aligned} \tag{23}$$

For a velocity modal coordinate output the matrices and resulting output are;

$$\begin{aligned}&C_d=[0\quad 1] \\ &D_d=[0] \\ &\dot{\eta}_k=[0\quad 1]\begin{Bmatrix}\eta_k\\ \dot{\eta}_k\end{Bmatrix}+[0]f_k\end{aligned} \tag{24}$$

To generate an acceleration reference modal coordinate the continuous time state space matrices are also used. The state vector from the discrete time real normal mode reference model can used with the continuous time state space matrices to generate an acceleration reference modal coordinate as follows;

$$\begin{Bmatrix}\dot{\eta}_k\\ \ddot{\eta}_k\end{Bmatrix}=A_c\begin{Bmatrix}\eta_k\\ \dot{\eta}_k\end{Bmatrix}+B_cf_k \tag{25}$$

The acceleration reference component is extracted as follows;

$$\begin{aligned}\ddot{\eta}_k&=[0\quad 1]\begin{Bmatrix}\dot{\eta}_k\\ \ddot{\eta}_k\end{Bmatrix} \\ &=[0\quad 1]\left[A_c\begin{Bmatrix}\eta_k\\ \dot{\eta}_k\end{Bmatrix}+B_cf_k\right] \\ &=[0\quad 1]A_c\begin{Bmatrix}\eta_k\\ \dot{\eta}_k\end{Bmatrix}+[0\quad 1]B_cf_k \\ &=[0\quad 1]\begin{bmatrix}0 & 1\\ -\omega_n^2 & 2\sigma\end{bmatrix}\begin{Bmatrix}\eta_k\\ \dot{\eta}_k\end{Bmatrix}+[0\quad 1]\begin{bmatrix}0\\1\end{bmatrix}f_k \\ &=[-\omega_n^2\quad 2\sigma]\begin{Bmatrix}\eta_k\\ \dot{\eta}_k\end{Bmatrix}+[1]f_k \\ &=C_d\begin{Bmatrix}\eta_k\\ \dot{\eta}_k\end{Bmatrix}+D_df_k\end{aligned} \tag{26}$$

Thus, the $C_d$ and $D_d$ matrices for the discrete time, reference, state space model to generate an acceleration reference modal coordinate are;

$$C_d=[-\omega_n^2 2\sigma]$$

$$D_d=[1] \quad (27)$$

Complex Reference Model—1st Order

For a system which has complex modes (non-proportional damping) a first order reference model 58 is required. As for the second order normal mode case, a continuous time state space model is first found, then transformed to a discrete time version. The first order continuous time reference model is of the form;

$$\dot{\eta}=\lambda\eta-jf \quad (28)$$

In this case both $\eta$ and $\lambda$ are complex valued. The continuous time state space system matrices are simple complex scalars;

$$A_c=\lambda$$

$$B_c=-j \quad (29)$$

As before, the discrete time version of the state space system matrices (Ad, Bd) are obtained with a standard transformation. A displacement output is obtained with Cd and Dd matrices of the form;

$$C_d=1$$

$$D_d=0 \quad (30)$$

A velocity reference modal coordinate output can be obtained by utilizing the continuous time state space matrices in conjunction with the discrete time model;

$$\dot{\eta}_k=A_c\eta_k+B_cf_k \quad (31)$$

Thus, the Cd and Dc matrices required for the discrete time complex reference model to output a velocity modal coordinate are simply the continuous time Ac and Bc matrices;

$$C_d=\lambda$$

$$D_d=-j \quad (32)$$

Application of the Reference Model

All of the preceding reference models 58 are utilized in the same manner to calculate STF coefficients $b_{ij}$ defining the STF 18. The purpose is to generate a reference modal coordinate time history using knowledge of a pole value and measured input to the system of interest. This is accomplished in the following manner.

Initially, the pole value of interest is estimated from measured input and output data using any of a wide variety of known parameter estimation methods. The reference model 58 is then calculated from the pole value as detailed hereinabove. Input excitations force 54 in the case of a structural system, is applied to the system 22 of interest to cause response 24.

The input excitation and system response 54 and 24 are measured with the digital data acquisition and processing system 16 at discrete time intervals with analog to digital converters (ADCs) 30. The measured excitation force, $f_k$, at each time instant is used to update the discrete time reference model by performing the matrix multiplications in Equation (15) to calculate the reference modal coordinate, $\eta_{k+1}$, at the next time instant, k+1. This process is repeated to generate a reference modal coordinate time history of the desired length (number of time points). Initially (k=0), the starting values of the state vector, $q_0$, are not known. They are set to zero initially. Any error associated with this arbitrary initial condition decays to zero with sufficient time.

Once the reference modal coordinate time history is available one of the solution methods discussed makes use of it to calculate the STF coefficients. Adaptive methods of calculating STF coefficients $b_{ij}$ run the reference models 58 continuously and use each additional time sample of the reference modal coordinate time history to update the STF filter coefficients $b_{ij}$.

On-line Adaptive Generation of STF Coefficients

The off-line batch solution procedure discussed above has an equivalent on-line adaptive implementation where at each sample cycle or instance in time, when a new sample of input and output data 54 and 56 is acquired by the digital data acquisition and processing system 16, the estimates of the STF and the input influence coefficients $b_{ij}$ and l are updated. While the following discussion describes an on-line adaptive generation of spatio-temporal filter coefficients $b_{ij}$ it should be appreciated that this adaptive generation method could also be performed in an off-line manner.

The advantages of an on-line, adaptive calculation method for STF coefficients $b_{ij}$ are many. Many control and monitoring applications benefit greatly from a system which is robust to sensor failures, actuator failures and other system changes such a calibration drift or degradation of actuators or other components due to damage and wear. If the STF coefficients $b_{ij}$ are adaptively updated, when a sensor 20 fails the algorithm will adjust the STF coefficients $b_{ij}$ such that the STF 18 continues to function as desired, synthesizing signals corresponding to decoupled SDOF modal coordinate response of the system modes of interest. When an actuator fails, if the signal driving the reference models 61 is the input command to the system, the associated input influence coefficient estimated by the adaptive STF will go to zero. This indicates the failure and provides the information necessary to adjust the control force vectors applied to a structure in a control application to continue to meet the control objectives.

For the general case where L excitation inputs (force in the case of a structural system) are applied and measured, L separate but identical subcomponent reference models 61 are used, one for each measured input 56 to the system 22. These L subcomponent reference systems 58 generate L subcomponent SDOF reference modal coordinate responses, $\eta_k^{(r1)}$ through $\eta_k^{(rL)}$, where the subscript k is the time index referring to the time sample number. These L subcomponent modal coordinate responses may be assembled in a column vector, $\eta_k^r$.

$$\eta_k^r = \begin{Bmatrix} \eta_k^{(r_1)} \\ \vdots \\ \eta_k^{(r_L)} \end{Bmatrix} \quad (33)$$

The total reference modal coordinate response of the system, $\eta_k^{(r)}$, is the weighted sum of the individual subcomponent reference modal coordinate responses, $\eta_k^{(r1)}$ through $\eta_k^{(rL)}$, where the weighting coefficients are the input influence coefficients (or modal participation factors), $l_l$ through $l_L$. This may be expressed as an inner product between the vector of subcomponent reference modal coordinate responses and the vector of input influence coefficients.

$$\eta_k^{(r)} = \begin{Bmatrix} l_1 \\ \vdots \\ l_L \end{Bmatrix}^T \begin{Bmatrix} \eta_k^{(r_1)} \\ \vdots \\ \eta_k^{(r_L)} \end{Bmatrix} = l^T \eta_k^r \tag{34}$$

In Equation (34) $\eta_k^{(r)}$ is the scalar total reference modal coordinate response of the system at time instant k, l is the vector of input influence coefficients and $\eta_k^r$ is the vector of individual subcomponent reference modal coordinate responses at time instant k.

On-line adaptive algorithms attempt to estimate solution parameters by minimizing an error quantity which is a function of the solution parameters. To adaptively estimate STF coefficients, ψ, and associated input influence coefficients, l, the problem is formulated with an error function which is the difference between the total reference modal coordinate, $\eta_k^{(r)}$, and the modal coordinate signal synthesized by the STF 18, $\hat{\eta}_k$.

$$e_k = \eta_k^{(r)} - \hat{\eta}_k = l^T \eta_k^r - \psi^T \tilde{x}_k \tag{35}$$

The terms in Equation (35) may be combined into a single inner product;

$$e_k = l^T \eta_k^r - \psi^T \tilde{x}_k = \begin{Bmatrix} \psi \\ l \end{Bmatrix}^T \begin{Bmatrix} -\tilde{x}_k \\ \eta_k^r \end{Bmatrix} \tag{36}$$

The $\tilde{x}_k$ term in Equation (36) is the general time shifted, spatio-temporal response which consists of responses measured at various spatial locations and time shifted versions of these responses.

There are many adaptive algorithms which can calculate the parameters ψ and l by minimizing the error in Equation (36). These algorithms are known to those skilled in the art of digital signal processing and do not comprise part of this patent. Details of these algorithms may be found in many texts and publications including, Haykin, S., *Adaptive Signal Processing,* Prentice Hall, Englewood Cliffs, N.J., 1986; Astrom, K. J., *Adaptive Control,* Addison-Wesley Publishing Co., New York, 1989; Johnson, C. R., *Lectures on Adaptive Parameter Estimation,* Prentice Hall, New Jersey, 1988. An overview of three adaptive algorithms for use with the method and apparatus of the present invention, including the Least Mean Squares (LMS), the Normalized Least Mean Squares (NMLS), and the Recursive Least Squares with exponential forgetting factor (RLS) is provided below. However, it should be appreciated that other adaptive algorithms could likewise be employed.

For all adrptive algorithms, at each time instant, k, the estimate of the parameters is updated to $$\begin{Bmatrix} \psi \\ l \end{Bmatrix}_{k+1},$$

based on the previous estimate of the parameters, $$\begin{Bmatrix} \psi \\ l \end{Bmatrix}_k,$$

the error $e_k$, and the measured data and reference modal coordinates, $y_k$, where, $$y_k = \begin{Bmatrix} -\tilde{x}_k \\ \eta_k^r \end{Bmatrix} \tag{37}$$

The update equation for the Least Mean Square (LMS) adaptive algorithm is;

$$\begin{Bmatrix} \psi \\ l \end{Bmatrix}_{k+1} = \begin{Bmatrix} \psi \\ l \end{Bmatrix}_k - \mu e_k y_k \tag{38}$$

The $\mu$ parameter in Equation (38) is the adaptive step size which must be chosen properly to achieve acceptable convergence rates and also avoid instability.

A similar algorithm, the Normalized LMS (NLMS) algorithm guarantees stability of the algorithm for adaptive steps sizes $0<\mu<2$.

$$\begin{Bmatrix} \psi \\ l \end{Bmatrix}_{k+1} = \begin{Bmatrix} \psi \\ l \end{Bmatrix}_k - \frac{\mu}{\alpha + y_k^H y_k} e_k y_k \tag{39}$$

The α parameter in Equation (39) is chosen as a small number (relative to the norm of the expected value of $y_k$) to prevent the algorithm from "blowing up" if $y_k$ becomes very small. $\mu$ is the adaptive step size as in the LMS algorithm.

The update equation for the Recursive Least Squares (RLS) algorithm with exponential forgetting factor, β, is;

$$\begin{Bmatrix} \psi \\ l \end{Bmatrix}_k = \begin{Bmatrix} \psi \\ l \end{Bmatrix}_{k-1} - \frac{P_{k-1}}{\beta + y_k^H P_{k-1} y_k} e_k y_k, \tag{40}$$

The β parameter determines how much recent data is weighted in the calculation versus past data. Typical values of β range from 0.95 to 0.99. A lower value of β discounts past data more quickly resulting in faster adaptation to changing parameters at the expense of greater sensitivity to noise and associated variance in the parameter estimates. A higher value of β retains data for a longer period (averages for a longer period) thus reducing sensitivity to noise but also slows the rate at which the algorithm can adapt to changes in the system.

In Equation (40) $P_k$ is the inverse of the data correlation matrix;

$$P_k = \left[\sum_{i=1}^{k} y_i y_i^H\right]^{-1} \tag{41}$$

Rather than performing the calculation in Equation (41) at each iteration the $P_k$ matrix is also updated on-line with the following update equation.

$$P_k = \left(I - \frac{P_{k-1} y_k y_k^H}{\beta + y_k^H P_{k-1} y_k}\right) \frac{P_{k-1}}{\beta} \tag{42}$$

The RLS algorithm converges faster and is more robust to noise than the LMS algorithms at the expense of greater computation requirements.

In implementing these general adaptive algorithm to solve for STF coefficients $b_{ij}$ an additional requirement exists. Examining Equation (36) it is clear that if both ψ and l are zero the error, $e_k$, is also zero. This "null" solution is a defective solution which must be avoided. Two approaches have been used to address this issue; imposing a norm constraint or artificially specifying the value of one of the STF solution parameters.

The norm constraint approach prevents convergence to ψ=l=0 by resetting the norm of either ψ or l to a specific value (for instance unity) if the norm falls below this value. For instance, to constrain the norm of ψ the following step is also performed at each update cycle of the adaptive algorithm, LMS, NLMS, RLS or any other algorithm.

$$\text{IF } \|\psi_k\| \geq 1, \begin{Bmatrix} \psi \\ l \end{Bmatrix}_k = \begin{Bmatrix} \psi \\ l \end{Bmatrix}_k \tag{43}$$

$$\text{IF } \|\psi_k\| < 1, \begin{Bmatrix} \psi \\ l \end{Bmatrix}_k = \begin{Bmatrix} \psi \\ l \end{Bmatrix}_k \Big/ \|\psi_k\|$$

In Equation (43) the notation $\|\psi_k\|$ refers to the two norm of $\psi_k$. In the second approach one of the solution parameters is artificially specified or "locked" to a certain value. If $l_1$ is set equal to unity Equation (35), the error equation, then becomes $$\begin{aligned} e_k &= l^T \eta_k^r - \psi^T \tilde{x}_k \\ &= \begin{Bmatrix} l_1 \\ \vdots \\ l_L \end{Bmatrix}^T \begin{Bmatrix} \eta_k^{(r_1)} \\ \vdots \\ \eta_k^{(r_L)} \end{Bmatrix} - \psi^T \tilde{x}_k \\ &= \eta_k^{(r_1)} - \begin{Bmatrix} \psi \\ l_2 \\ \vdots \\ l_L \end{Bmatrix}^T \begin{Bmatrix} \tilde{x}_k \\ -\eta_k^{(r_2)} \\ \vdots \\ -\eta_k^{(r_L)} \end{Bmatrix} \\ &= \eta_k^{(r_1)} - \begin{Bmatrix} \psi \\ l_2 \\ \vdots \\ l_L \end{Bmatrix}^T y_k \end{aligned} \tag{44}$$

The implementation of the adaptive algorithms is otherwise unchanged.

Control and Monitoring of Linear Systems with STF

Figure 10:
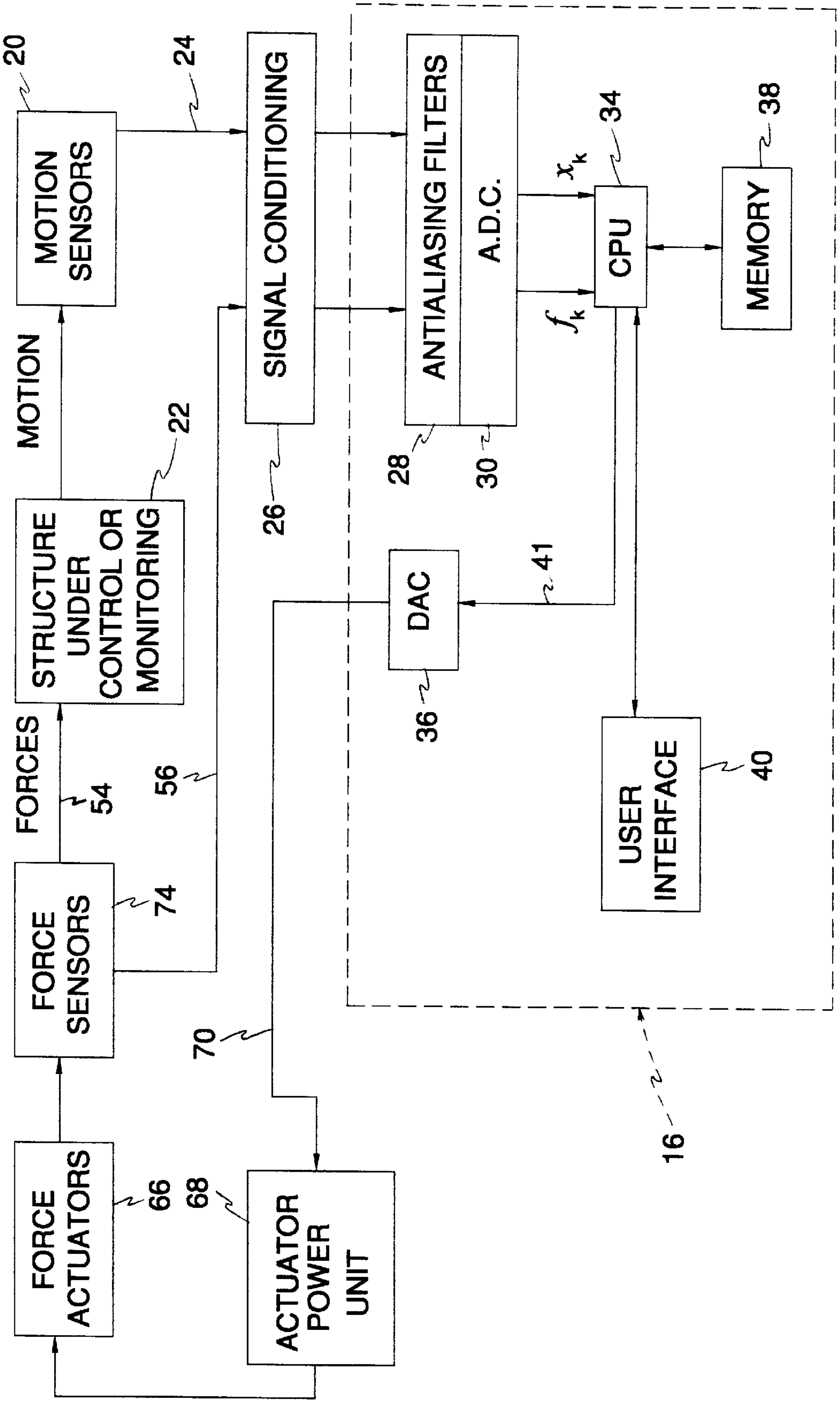
FIG. 10 is a block diagram illustrating a system for the monitoring and control of a linear dynamic system, the system incorporating the method and apparatus of the present invention.

The STF invention has unparalleled utility and advantage for the control and monitoring of complex structures or systems 22 with complicated multi-mode, multi-degree-of-freedom (MDOF) response. Such an application of the STF 18 of the present invention would utilize one or multiple STF's 18 to synthesize signals corresponding to single or multiple decoupled SDOF modal responses of the linear dynamic system which are to be controlled or monitored. A control and monitoring algorithm processes the signals 43 corresponding to simple decoupled SDOF modal responses as synthesized by the STF 18, determining the correct force to apply to the structure 22 to actively control its response or to estimate the modal frequency and damping to monitor the dynamic characteristics. FIG. 10 is a block diagram detailing control and/or monitoring of a structure 22 with the STF of the present invention, while FIG. 11 is a block diagram of the processing which occurs in the CPU in FIG. 10.

Referring further to FIG. 10, the motion of the structure of interest is measured with motion sensors 20 which generate a voltage or response signal 24 proportional with the measured motion quantity (displacement, velocity, acceleration, strain, etc.). Force actuators 66 are driven by actuator power units 68 which are commanded by voltage signals 70 output by digital to analog converters (DACs) 36 in the digital data acquisition and processing system 16. Examples of force actuators and associated power units include electromagnetic drivers (or shakers), either fixed or a reaction mass type and current or voltage power amplifiers. Substituted therefore may be any suitable actuator and power unit including a hydraulic cylinder and ram with an associated hydraulic power unit. Force sensors 74 measure the force 54 applied to the system 22. Alternatively, the force command 70 supplied by the computer to the actuator power unit 68 may be used as a force signal for purposes of calculating STF coefficients. Further, the DAC command 41 to the DAC 36 may be used as a force signal for purposes of calculating STF coefficients. The force and response signals 56 and 24 preferably pass through an optional signal conditioning electronics 26 and anti-aliasing filters 28. The signals are then digitized by ADC's 30. The digital amplitude values are sampled at a chosen sample rate and passed to the central processing unit 34 for processing as discussed hereinabove.

Figure 11:
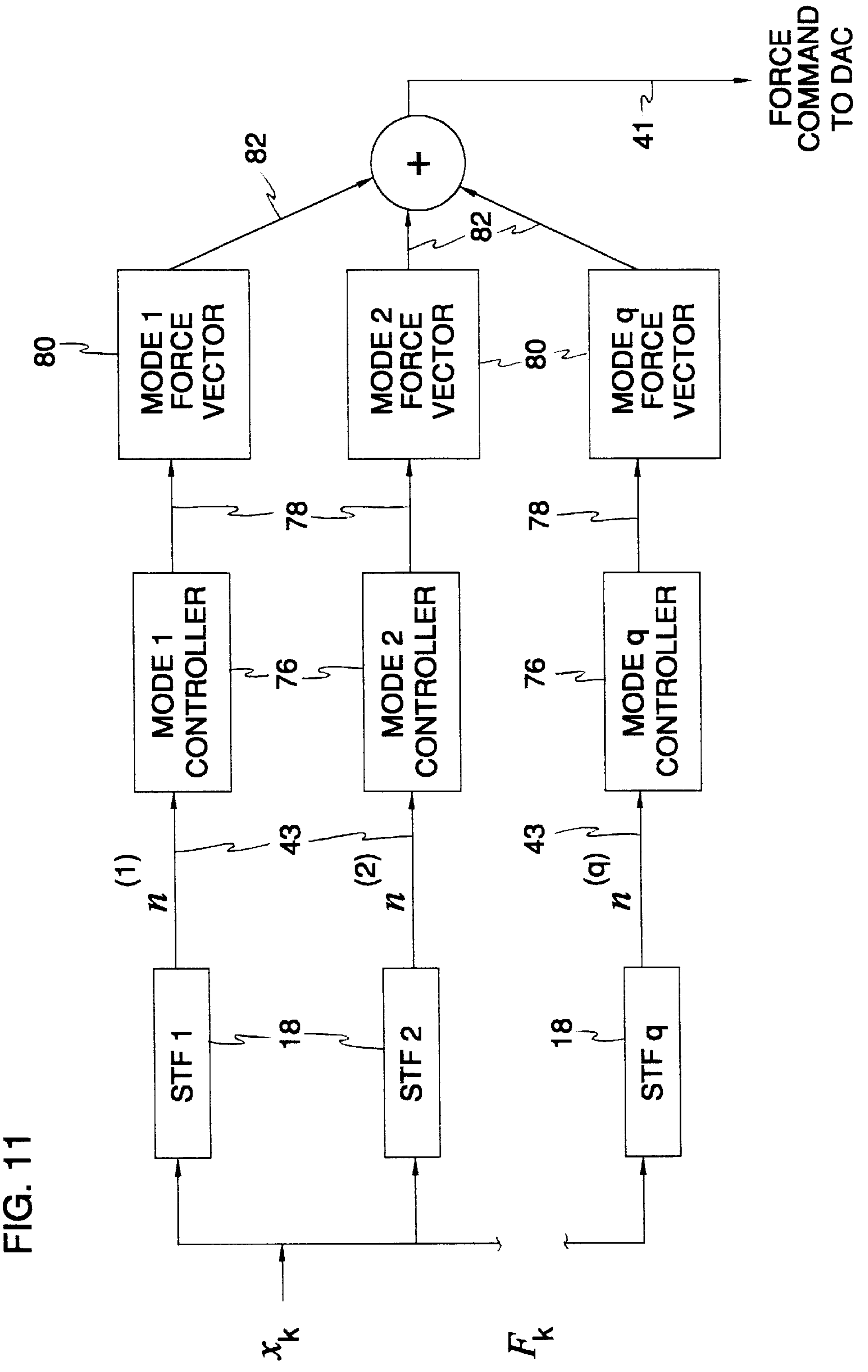
FIG. 11 is a block diagram illustrating the processing which occurs in the central processing unit of FIG. 10.

Referring now to FIG. 11, the response, $x_k$, digitized by the ADC's 30 is passed to the CPU 34. The CPU 34 applies q STFs 18 to the response (as detailed in FIG. 6) to synthesize signals corresponding to q decoupled SDOF modal coordinate responses 43 of the linear dynamic system. Q modal controllers 76 act on these signals 43 to calculate a suitable modal control signal 78 for each mode. These modal controllers 76 may be any form of'standard controller which is known to those skilled in the art. For instance, it may be a proportional-integral-derivative (PID) controller. A common controller is a derivative controller which calculates the derivative of the signals corresponding to the decoupled SDOF modal coordinate responses and feeds this back to increase the damping of the structural modes.

The modal control signal 78 generated by each modal controller 76 is a scalar signal. If L actuators 66 are being utilized, this scalar modal control signal is expanded to L control signals by multiplying the control signal 78 by a force vector 80. There are many considerations involved in choosing the optimal force vector. The degree to which the forces 54 (f) acting on the system 22 under control influence the i'th mode is determined by the projection of the forces 54 on the associated i'th vector of input influence coefficients, $l^{(i)}$ (or modal participation vector). This is the inner product between the two $l^{(i)^T}$ f.

The force applied by the L actuators 66 is determined by the summation of q sets of L control force signals 82. The L control signals 82 resulting from the i'th modal controller 76 are the product of the force vector 80 for the i'th mode ($f^{(i)}$) and the scalar modal control signal 78 for the i'th mode ($c^{(i)}$).The total force is then;

$$f = \sum_{i=1}^{q} c^{(i)} f^{(i)} \tag{45}$$

The degree each modal controller influences the associated mode of interest is proportional to the projection of the associated force vector 80 ($f^{(i)}$) on the vector of input influence coefficients $l^{(i)}$. This is equal to $l^{(i)^T} f^{(i)}$.

Various considerations are involved in choosing an optimal force vector 80 ($f^{(i)}$) The maximum individual actuator force required is minimized by choosing a force vector of the form;

$$f^{(i)} = \text{sign}(l^{(i)}) \tag{46}$$

In this case the force vector 80 ($f^{(i)}$) is a vector of ones or negative ones, such that each coefficient is the same amplitude but has the same sign as the associated input influence coefficient. This results in all the actuators 66 reaching their maximum force application limit in unison (when just one mode is being controlled).

The total drive power required is minimized by choosing a force vector 80 of the form;

$$f^{(i)} = l^{(i)} \tag{47}$$

In this case the force vector 80 ($f^{(i)}$) is chosen which is the same as the vector of input influence coefficients. The total power consumed by all the actuators 66 is the sum of the mechanical power transferred to the linear dynamic system 22 and the losses in the actuators 66. The mechanical power transmitted determines the effect the control system has on the linear dynamic system 22. The losses are proportional to the sum of the squares of the force produced by each actuator 66.

Actuator power is minimized, for a given control effect on the linear dynamic system 22, by minimizing the norm of the force vector, $\|f^{(i)}\|$, subject to the constraint that the desired control effect, determined by the quantity $l^{(i)^T} f^{(i)}$, is held constant. Any potential force vector may be separated into a component parallel with $l^{(i)}$ and a component perpendicular to $l^{(i)}$. The perpendicular component does not cause any response of the linear dynamic system 22, however, it dissipates energy. Minimum energy dissipation is achieved by setting the perpendicular component to zero, thus $f^{(i)} = l^{(i)}$.

A major consideration which multiple actuators can address is suppression of residual response of modes other than the controlled modes due to the applied control force. Residual excitation of non-target modes can be reduced or eliminated with multiple actuators by minimizing the projection of the force vector on the vectors of input influence coefficients of non-target modes. The goal for instance is for;

$$l^{(r)^T} f^{(i)} = \text{large } r = i$$

$$l^{(r)^T} f^{(i)} = 0 \text{ or small } r \neq i \tag{48}$$

where Mode i is the target mode and Modes r are the other modes in the frequency range of interest. Force projection on non-target modes can be eliminated (provided the vectors of input influence coefficients of the considered modes are linearly independent) by choosing force vectors which are the rows of the pseudo inverse of the matrix consisting of the vectors of input influence coefficients of the considered modes.

Consider, for instance, the case where Mode 2 is the controlled mode and it is desired to eliminate excitation of residual response of Modes 1 and 3. The force vector would be calculated as:

$$\begin{bmatrix} f^{(1)^T} \\ f^{(2)^T} \\ f^{(3)^T} \end{bmatrix} = [\, l^{(1)} \;\; l^{(2)} \;\; l^{(3)} \,]^+ \tag{49}$$

where the + superscript indicates pseudo inverse. This $f^{(2)}$ vector would eliminate residual response of Modes 1 and 3.

Based on these considerations appropriate control force vectors are calculated and used to generate q sets of L control force signals 82. The corresponding elements from each of the control signal vectors are summed, resulting in L control signals 41 (force commands to DAC), one for each of the L actuators acting on the structure. For instance, the $1^{st}$ elements of each of the q control signal vectors are summed to form the $1^{st}$ element of the summed control signal vector, the $2^{nd}$ elements of each of the q control signal vectors are summed to form the $2^{nd}$ element of the summed control signal vector, etc. These L signals are then output through the Digital to Analog converter 36 of the digital acquisition and processing system 16 and passed to the actuator power units 68, resulting in the appropriate control forces being applied by the force actuators 66 acting on the structure 22.

While the methods herein described, and the forms of apparatus for carrying these methods into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. An apparatus for generating a plurality of synthesized response signals corresponding to decoupled single degree-of-freedom (SDOF) modal responses being simultaneously excited in a linear dynamic system comprising;

at least one sensor, each sensor of said at least one sensor mounted at a location on said linear dynamic system for generating at least one response signal representing an actual response of said linear dynamic system at said location;

a data acquisition system for periodically sampling said at least one response signal at different instances in time, storing a sequence of digitized samples for said at least one response signal and associating each of said digitized samples with one of said different instances in time;

means for reading said sequence of digitized samples;

means for generating a first reference model having dynamic characteristics substantially similar to a first single mode of said linear dynamic system;

means for exciting said first reference model using an input excitation similar to an input excitation applied to said linear dynamic system, and for producing a first reference modal coordinate response at each of said different instances in time;

means for calculating from said sequence of digitized samples a first set of spatio-temporal filter coefficients, said first set of spatio-temporal filter coefficients being based upon a plurality of said digitized samples associated with said different instances in time; and a synthesizer for applying said first set of spatio-temporal filter coefficients to said at least one response signal, and for generating a synthesized response signal corresponding to a decoupled SDOF modal response of the linear dynamic system.

2. The apparatus of claim 1 wherein said first set of spatio-temporal filter coefficients have values associated with any one of said different instances in time which, when simultaneously applied to a plurality of said digitized samples from selected instances in time will synthesize a signal which substantially matches said first reference modal coordinate response at said any one of said different instances in time.

3. The apparatus of claim 1 further comprising:

means for generating a second reference model having dynamic characteristics substantially similar to a second single mode of said linear dynamic system;

means for exciting said second reference model using an input excitation similar to an input excitation applied to said linear dynamic system, and for producing a second reference modal coordinate response at each of said different instances in time; and means for calculating from said sequence of digitized samples a second set of spatio-temporal filter coefficients, said second set of spatio-temporal filter coefficients being based upon a plurality of said digitized samples associated with said different instances in time.

4. The apparatus of claim 1 further comprising means for updating said first set of spatio-temporal filter coefficients as said at least one response signal is periodically sampled by said data acquisition system.

5. Amended) The apparatus of claim 1 further comprising:

a plurality of excitation inputs applied to said linear dynamic system;

means for generating a plurality of identical subcomponent reference models associated with each of said excitation inputs; and means for calculating from said sequence of digitized samples a set of input influence coefficients and associating each of said input influence coefficients with one of said identical subcomponent reference models.

6. The apparatus of claim 5 further comprising:

means for receiving a plurality of input signals representing said plurality of excitation inputs;

means for applying each of said input signals to one of said plurality of identical subcomponent reference models to generate a plurality of subcomponent reference modal coordinate responses; and wherein said input influence coefficients have values which, when summed together after being applied individually to said plurality of subcomponent reference modal coordinate responses generate a signal corresponding to said first reference modal coordinate response from said first reference model.

7. The apparatus of claim 6 further comprising:

a plurality of actuators for providing said plurality of excitation inputs to said linear dynamic system;

influence means for generating a set of control force vectors in response to said set of input influence coefficients;

a modal controller for generating a modal control signal in response to said synthesized response signal corresponding to said decoupled SDOF modal response, said modal control signal expanded to a plurality of control input signals by multiplying said modal control signal by said set of control force vectors; and an actuator power unit for controlling independently each said actuator in response to said plurality of control input signals.

8. The apparatus of claim 1 further comprising:

an actuator for providing an excitation input to said linear dynamic system;

means for receiving an input signal representing said excitation input;

a modal controller for generating a modal control signal in response to said synthesized response signal corresponding to said decoupled SDOF modal response; and an actuator power unit for controlling said actuator in response to said modal control signal.

9. An apparatus for decoupling a multiple-degree-of-freedom (MDOF) response of a linear dynamic system into a single-degree-of-freedom (SDOF) modal response, said apparatus comprising:

at least one sensor, each sensor of said at least one sensor mounted at a location on said linear dynamic system for generating at least one measured response signal representing actual response of said linear dynamic system at said location;

a data acquisition system for periodically sampling said at least one measured response signal at different instances in time and storing a digitized sample of said at least one measured response signal for each of said different instances in time, said digitized sample representing a MDOF response of said linear dynamic system at one of said different instances in time;

a digital signal processor including a central processing unit for reading said digitized sample and calculating therefrom a spatio-temporal filter including a set of spatio-temporal filter coefficients; and a synthesizer for applying said spatio-temporal filter coefficients to said digitized sample from selected instances in time, and for generating a synthesized response signal representing a decoupled SDOF modal response of said linear dynamic system.

10. The apparatus of claim 9 wherein said central processing unit includes means for calculating from said digitized sample a plurality of spatio-temporal filters operating in parallel, each of said spatio-temporal filters generating a response signal representing a separate decoupled SDOF modal response of said linear dynamic system.

11. The apparatus of claim 9 further comprising:

an excitation input applied to said linear dynamic system;

a sensor for generating an input signal representing said excitation input; and means for generating an SDOF reference model having dynamic characteristics substantially similar to said decoupled SDOF modal response of the linear dynamic system; and a reference modal response generated by said central processing unit by applying said input signal to said SDOF reference model.

12. The apparatus of claim 11 wherein said central processing unit includes means for calculating said spatio-temporal filter coefficients by comparing said synthesized response signal to said reference modal response.

13. The apparatus of claim 9 further comprising:

a plurality of excitation inputs applied to said linear dynamic system;

a plurality of sensors for generating input signals representing said plurality of excitation inputs;

with means for generating a plurality of subcomponent reference models associated with each of said excitation inputs;

means for generating a plurality of subcomponent reference modal coordinate response signals by applying each of said input signals to one of said plurality of subcomponent reference models; and means for generating a total reference modal coordinate response by applying a set of input influence coefficients to said plurality of subcomponent reference modal coordinate response signals in order to produce weighted signals, and sumrning said weighted signals.

14. The apparatus of claim 13 wherein said central processing unit includes means for simultaneously calculating said spatio-temporal filter coefficients and said set of input influence coefficients by comparing said synthesized response signal to said total reference modal coordinate response.

15. An apparatus for calculating a spatio-temporal filter for decoupling a multiple-degree-of-freedom (MDOF) response of a linear dynamic system into a decoupled single-degree-of-freedom (SDOF) modal response, said apparatus comprising:

a data acquisition system for periodically sampling at least one response signal and at least one input signal at different instances in time, storing a sequence of digitized samples for said at least one response signal and said at least one input signal, and associating each of said digitized samples with one of said different instances in time;

wherein said at least one response signal represents the dynamic output of said linear dynamic system and said at least one input signal represents an excitation applied to said linear dynamic system;

a central processing unit for formning a reference model having dynamic characteristics substantially similar to a single mode of said linear dynamic system, and generating a SDOF reference modal coordinate response by reading and applying said at least one input signal to said reference model; and means for calculating from said sequence of digitized samples a set of spatio-temporal filter coefficients, said set of spatio-temporal filter coefficients being based upon a plurality of said digitized samples and having values which, for each of said different instances in time, when simultaneously applied to a plurality of said digitized samples from selected instances in time will synthesize a signal which substantially matches said SDOF reference modal coordinate response at each of said different instances in time.

16. The apparatus of claim 15 wherein said data acquisition system receives a plurality of input signals, said central processing unit forms a plurality of subcomponent reference models, each one of said subcomponent reference models associated with one of said input signals, said plurality of input signals applied to said plurality of subcomponent reference models to form a plurality of subcomponent reference modal coordinate response signals, each said subcomponent reference modal coordinate response signal multiplied by an associated input influence coefficient and subsequently summed together to form a total reference modal coordinate response corresponding to said decoupled SDOF modal response.

17. The apparatus of claim 16 wherein said central processing unit simultaneously calculates said input influence coefficients and said spatio-temporal filter coefficients by defining said input influence coefficients as applied to said subcomponent reference modal coordinate response signals as equal to said spatio-temporal filter coefficients applied to selected ones of said digitized samples which corresponds to said decoupled SDOF modal response.

18. An apparatus for generating a synthesized signal corresponding to a decoupled single-degree-of-freedom (SDOF) modal response of a linear dynamic system excited in a manner producing a multiple-degree-of-freedom (MDOF) response, said apparatus comprising:

a plurality of excitation inputs applied to said linear dynamic system;

a plurality of input sensors for generating a plurality of input signals representing said plurality of excitation inputs;

a plurality of response sensors mounted at spaced locations on said linear dynamic system for generating a plurality of measured response signals representing actual (MDOF) responses of said linear dynamic system at said spaced locations;

a data acquisition system for periodically sampling during a plurality of sampling cycles said plurality of input signals and said plurality of measured response signals for producing digitized samples of said plurality of input signals and said plurality of measured response signals;

a central processing unit for reading said digitized samples of said plurality of input signals and said plurality of measured response signals, and generating in response thereto a modal filter and a set of input influence coefficients;

a plurality of subcomponent reference models created by said central processing unit for generating a plurality of subcomponent reference modal coordinate response signals when said plurality of input signals are applied to said plurality of subcomponent reference models; and wherein said central processing unit includes means for associating each of said input influence coefficients with one of said subcomponent reference models.

19. The apparatus of claim 18 wherein said set of input influence coefficients have values which, when summed together after being independently applied to said plurality of subcomponent reference modal coordinate response signals, will generate a signal corresponding to a response from a reference model having dynamic characteristics substantially similar to a single mode of said linear dynamic system.

20. The apparatus of claim 18 wherein said modal filter comprises a spatio-temporal filter including a set of spatio-temporal filter coefficients, said set of spatio-temporal coefficients calculated by said central processing unit and having values which, when applied to selected ones of said digitized samples of said plurality of measured response signals, will produce a signal corresponding to said decoupled SDOP modal response.

21. The apparatus of claim 18 further comprising:

a plurality of actuators for providing said plurality of excitation inputs to said linear dynamic system;

means defined by said central processing unit for generating a set of control force vectors in response to said set of input influence coefficients;

a modal controller defined by said central processing unit for generating a modal control signal in response to said decoupled SDOF modal response, said modal control signal expanded to a plurality of control input signals by multiplying said modal control signal by said set of control force vectors; and an actuator power unit for controlling independently each said actuator in response to said plurality of control input signals.

22. A method of generating a plurality of synthesized signals representing decoupled single-degree-of-freedom (SDOF) responses being simultaneously excited in a linear dynamic system, the method comprising the steps of:

exciting said linear dynamic system;

generating at least one response signal representing actual response of said linear dynamic system;

periodically sampling said at least one response signal to produce a sequence of digitized samples thereof, storing said sequence of digitized samples;

generating a first reference model having dynamic characteristics substantially similar to a first single mode of said linear dynamic system;

exciting said first reference model substantially similar to said linear dynamic system for producing a first reference model coordinate response at a plurality of instances in time;

processing said sequence of digitized samples to produce a first set of spatio-temporal filter coefficients, said first set of spatio-temporal filter coefficients being based upon a plurality of said digitized samples associated with said plurality of instances in time; and applying said spatio-temporal filter coefficients to said at least one response signal for generating said plurality of synthesized signals.

23. The method of claim 22 wherein said first set of spatio-temporal coefficients have values associated with any one of said plurality of instances in time which, when simultaneously applied to a plurality of said sequence of digitized samples, will synthesize a signal which substantially matches said first reference modal coordinate response at said any one of said instances in time.

24. The method of claim 22 further comprising the steps of:

generating a second reference model having dynamic characteristics substantially similar to a second single mode of said linear dynamic system;

exciting said second reference model substantially similar to said linear dynamic system for producing a second reference modal coordinate response at each of said plurality of instances in time; and processing said digitized samples to produce a second set of spatio-temporal filter coefficients, said second set of spatio-temporal filter coefficients being based upon a plurality of said digitized samples associated with said plurality of instances in time.

25. The method of claim 22 further comprising the step of updating said first set of spatio-temporal filter coefficients as said at least one response signal is periodically sampled.

26. The method of claim 22 wherein said step of exciting said linear dynamic system comprises applying a plurality of excitation inputs to said linear dynamic system, said method further comprising the step of generating a set of input influence coefficients having values which, when summed together after being applied individually to separate reference modal coordinate responses, generate a total referenced modal coordinate response corresponding to a first decoupled SDOF system response.

27. The method of claim 26 further comprising the steps of:

generating a set of control force vectors in response to said set of input influence coefficients;

generating a modal control signal in response to said first decoupled SDOF system response;

expanding said modal control signal to a plurality of control input signals by multiplying said modal control signal by said set of control force vectors; and controlling independently each of said plurality of excitation inputs in response to said plurality of control input signals.

28. A method of generating a plurality of synthesized signals representing decoupled single-degree-of-freedom (SDOF) responses of a linear dynamic system excited in a manner producing a multiple-degree-of-freedom (MDOF) response, said method comprising the steps of:

applying a plurality of excitation inputs to said linear dynamic system;

generating a plurality of input signals representing said plurality of excitation inputs;

generating a plurality of measured response signals representing actual responses of a plurality of locations on said linear dynamic system;

periodically sampling said plurality of input signals and said plurality of measured response signals to produce a modal filter and a plurality of input influence coefficients;

producing a plurality of subcomponent reference models for generating a plurality of subcomponent reference modal coordinate response signals when said plurality of input signals are applied to said plurality of subcomponent reference models; and associating each of said input influence coefficients with one of said subcomponent reference models having values when applied to said plurality of subcomponent reference modal coordinate response signals, will produce a total SDOF reference modal response corresponding to a decoupled SDOF system response resulting from said modal filter applied to said plurality of measured response signals.

29. The method of claim 28 wherein said plurality of input influence coefficients have values which, when summed together after being independently applied to said plurality of subcomponent reference modal coordinate response signals, will generate a signal corresponding to a response from a reference model having dynamic characteristics substantially similar to a single mode of said linear dynamic system.

30. The method of claim 28 further comprising the step of generating a spatio-temporal filter including a set of spatio-temporal filter coefficients having values which, when applied to selected ones of said plurality of measured response signals, will produce said decoupled SDOF system response.

31. The method of claim 28 further comprising the steps of:

generating a set of control force vectors in response to said plurality of input influence coefficients;

generating a modal control signal in response to said decoupled SDOF system response;

expanding said modal control signal to a plurality of control input signals by multiplying said modal control signal by said set of control force vectors; and controlling independently each said excitation input in response to said plurality of control input signals.

* * * * *